United States Patent
Ghosh et al.

(10) Patent No.: US 12,488,195 B1
(45) Date of Patent: Dec. 2, 2025

(54) SYSTEM AND METHODS FOR CLASSIFICATION OF UNSTRUCTURED DATA USING SIMILARITY METRICS

(71) Applicant: Wells Fargo Bank, N.A., San Francisco, CA (US)

(72) Inventors: Debashis Ghosh, Charlotte, NC (US); Maria Chiarenza, Indian Trail, NC (US); Nathaniel D. Mollison, Edina, MN (US); Matthew C. Howell, Waukee, IA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 467 days.

(21) Appl. No.: 17/931,366

(22) Filed: Sep. 12, 2022

(51) Int. Cl.
  *G06F 40/40* (2020.01)
  *G06F 40/174* (2020.01)
  *G06F 40/284* (2020.01)
  *G06Q 40/03* (2023.01)

(52) U.S. Cl.
  CPC ............ *G06F 40/40* (2020.01); *G06F 40/174* (2020.01); *G06F 40/284* (2020.01); *G06Q 40/03* (2023.01)

(58) Field of Classification Search
  CPC ...... G06F 40/40; G06F 40/174; G06F 40/284; G06Q 40/03
  USPC ............................................................. 704/9
  See application file for complete search history.

(56) References Cited

U.S. PATENT DOCUMENTS

| | | |
|---|---|---|
| 6,411,938 B1 | 6/2002 | Gates |
| 7,797,211 B1 | 9/2010 | Reeth, II |
| 9,558,521 B1 | 1/2017 | Eftekhari |
| 9,753,913 B1 * | 9/2017 | Kursun ................ G06F 16/285 |
| 10,025,933 B2 | 7/2018 | Wadley |
| 10,347,293 B1 * | 7/2019 | Skinner ................ G06F 3/1462 |
| 10,380,246 B2 * | 8/2019 | Clark .................... G06F 40/242 |
| 10,594,546 B1 * | 3/2020 | Davis ...................... G06F 17/40 |
| 10,878,505 B1 * | 12/2020 | Blair ....................... G06F 40/20 |
| 10,942,959 B1 | 3/2021 | Haider |
| 10,991,048 B1 * | 4/2021 | Blair ....................... G06F 40/20 |
| 11,164,245 B1 * | 11/2021 | Resheff .................. G06Q 20/42 |
| 11,170,878 B2 * | 11/2021 | Bell ........................ G16Z 99/00 |
| 11,222,031 B1 * | 1/2022 | Mohandas .............. G06F 40/30 |
| 11,461,407 B1 * | 10/2022 | Schafer .................. G06F 40/177 |
| 11,461,829 B1 * | 10/2022 | Wang ....................... G06N 3/09 |
| 11,487,942 B1 * | 11/2022 | Senthivel ............. G06N 3/0442 |
| 11,537,708 B1 * | 12/2022 | McTeggart ............ G06N 20/10 |
| 11,544,783 B1 * | 1/2023 | Flowers ................. G06Q 40/03 |
| 11,574,150 B1 * | 2/2023 | Sharma .................. G06Q 40/03 |
| 11,640,641 B2 | 5/2023 | Pai |
| 11,681,787 B1 * | 6/2023 | Genner ................. G06F 21/602 |
| | | 726/7 |

(Continued)

*Primary Examiner* — Thuykhanh Le
(74) *Attorney, Agent, or Firm* — K&L Gates LLP

(57) ABSTRACT

Systems, apparatuses, methods, and computer program products are disclosed for obtaining relevant data from an unstructured data source. An example method includes extracting relevant data that is intermixed with extraneous data using natural language processing. In order to do so, text from the unstructured data source may be tokenized and each token may be compared to an identifier associated with the relevant data. A similarity metric may be determined between each token and the identifier in order to classify tokens as similar or dissimilar to the identifier. All tokens classified as similar to the identifier may be aggregated in order to obtain relevant data.

20 Claims, 11 Drawing Sheets

(56) References Cited

U.S. PATENT DOCUMENTS

| | | | |
|---|---|---|---|
| 11,748,410 B2* | 9/2023 | Kiefer | G06F 16/31 |
| | | | 707/741 |
| 11,775,762 B1* | 10/2023 | Mason | G06F 16/3347 |
| | | | 704/9 |
| 11,783,414 B2* | 10/2023 | Roser | G06N 7/01 |
| | | | 705/38 |
| 11,816,425 B2 | 11/2023 | McArthur | |
| 11,842,313 B1* | 12/2023 | Ingraham | G06F 40/205 |
| 11,893,012 B1* | 2/2024 | Appalaraju | G06N 3/08 |
| 12,001,467 B1* | 6/2024 | U | G06F 16/35 |
| 12,019,987 B1* | 6/2024 | Yu | G06F 40/30 |
| 12,039,596 B1* | 7/2024 | Quijada | G06Q 40/03 |
| 12,067,606 B2* | 8/2024 | Jones | G06Q 20/3255 |
| 12,204,856 B1* | 1/2025 | Somasundaran | G06F 40/284 |
| 2003/0009418 A1 | 1/2003 | Green et al. | |
| 2003/0097342 A1 | 5/2003 | Whittingtom | |
| 2006/0004826 A1* | 1/2006 | Zartler | G06F 16/3344 |
| | | | 707/999.102 |
| 2006/0037076 A1* | 2/2006 | Roy | G06F 16/3344 |
| | | | 707/E17.078 |
| 2006/0288268 A1* | 12/2006 | Srinivasan | G06F 40/226 |
| | | | 715/210 |
| 2010/0332287 A1* | 12/2010 | Gates | G06Q 30/02 |
| | | | 379/265.09 |
| 2012/0078950 A1* | 3/2012 | Conrad | G06F 40/284 |
| | | | 707/769 |
| 2012/0095798 A1* | 4/2012 | Mabari | G06Q 10/0637 |
| | | | 705/7.17 |
| 2012/0158678 A1 | 6/2012 | McGraw | |
| 2013/0151561 A1* | 6/2013 | Pfeifle | G06F 16/322 |
| | | | 707/769 |
| 2013/0317888 A1 | 11/2013 | Serrano | |
| 2015/0025917 A1 | 1/2015 | Stempora | |
| 2015/0286790 A1* | 10/2015 | Ahmad | G16H 40/20 |
| | | | 705/2 |
| 2015/0332415 A1* | 11/2015 | Johansen | G06Q 30/04 |
| | | | 705/30 |
| 2016/0247087 A1* | 8/2016 | Nassar | G06F 40/40 |
| 2016/0267392 A1* | 9/2016 | Prager | G06F 40/40 |
| 2016/0371661 A1 | 12/2016 | Shah | |
| 2017/0195125 A1 | 7/2017 | Heppe | |
| 2017/0235735 A1* | 8/2017 | Ignatyev | G06Q 10/00 |
| | | | 706/12 |
| 2017/0270528 A1* | 9/2017 | Prakash | G06Q 20/3224 |
| 2017/0371958 A1* | 12/2017 | Ganjam | G06F 16/353 |
| 2017/0374093 A1* | 12/2017 | Dhar | G06Q 50/265 |
| 2018/0046785 A1* | 2/2018 | Anderson | G06F 21/31 |
| 2018/0174127 A1 | 6/2018 | Takasaki | |
| 2019/0065550 A1* | 2/2019 | Stankiewicz | G06F 16/248 |
| 2019/0238517 A1* | 8/2019 | D'Agostino | H04L 63/0428 |
| 2019/0347667 A1* | 11/2019 | Zhang | G06Q 20/4012 |
| 2020/0019608 A1* | 1/2020 | Gentile | G06F 18/2178 |
| 2020/0034832 A1* | 1/2020 | Korpal | G06Q 20/385 |
| 2020/0043019 A1* | 2/2020 | Hadavand | G06N 20/00 |
| 2020/0125639 A1* | 4/2020 | Doyle | G06F 40/30 |
| 2020/0125928 A1* | 4/2020 | Doyle | G06V 30/19147 |
| 2020/0126533 A1* | 4/2020 | Doyle | G10L 15/063 |
| 2020/0134714 A1 | 4/2020 | De Gaia et al. | |
| 2020/0184151 A1* | 6/2020 | Ekmekci | G06Q 10/0635 |
| 2020/0242299 A1* | 7/2020 | Ekmekci | G06F 40/30 |
| 2020/0349182 A1* | 11/2020 | Cintas | G06N 5/04 |
| 2020/0356866 A1* | 11/2020 | Chakrabarty | G06N 20/00 |
| 2020/0387529 A1* | 12/2020 | Jagadish | G06F 40/279 |
| 2021/0004578 A1* | 1/2021 | Coquard | G06F 18/2413 |
| 2021/0019657 A1* | 1/2021 | Wu | G06Q 10/0635 |
| 2021/0049700 A1* | 2/2021 | Nguyen | G06N 3/044 |
| 2021/0073224 A1* | 3/2021 | Zhao | G06F 16/2282 |
| 2021/0097605 A1* | 4/2021 | Yeri | G06F 16/3346 |
| 2021/0312127 A1* | 10/2021 | Braghin | G06N 3/08 |
| 2021/0342403 A1* | 11/2021 | Chazan | G06V 30/413 |
| 2021/0383366 A1* | 12/2021 | DePOPAS | G06Q 20/38215 |
| 2022/0067205 A1* | 3/2022 | Lindsay | G06F 40/284 |
| 2022/0067828 A1 | 3/2022 | Gross | |
| 2022/0121649 A1* | 4/2022 | Jin | G06N 3/045 |
| 2022/0138243 A1* | 5/2022 | Palagummi | G06F 16/953 |
| | | | 707/737 |
| 2022/0148113 A1* | 5/2022 | Mejia | G06Q 10/0635 |
| 2022/0171931 A1* | 6/2022 | Fusco | G06N 20/00 |
| 2022/0198427 A1* | 6/2022 | Jones | G06Q 20/326 |
| 2022/0215467 A1* | 7/2022 | Virk | G06Q 40/03 |
| 2022/0222446 A1* | 7/2022 | Jangid | G06F 11/0709 |
| 2022/0229980 A1* | 7/2022 | Jin | G06F 40/205 |
| 2022/0237389 A1* | 7/2022 | Dognin | G06N 5/025 |
| 2022/0237719 A1* | 7/2022 | Daniels | G06Q 20/102 |
| 2022/0237934 A1* | 7/2022 | Matcham | G06N 20/20 |
| 2022/0253729 A1* | 8/2022 | Vashist | G06N 5/04 |
| 2022/0253942 A1* | 8/2022 | Wang | G06F 40/284 |
| 2022/0292524 A1* | 9/2022 | Sarkar | G06Q 40/03 |
| 2022/0309109 A1* | 9/2022 | Benincasa | G06F 40/183 |
| 2022/0318219 A1* | 10/2022 | McBrearty | H04L 9/002 |
| 2022/0366064 A1* | 11/2022 | Nikoghossian | G06F 21/602 |
| 2022/0366490 A1* | 11/2022 | Duttagupta | G06F 16/353 |
| 2022/0374903 A1* | 11/2022 | Sarin | G06Q 20/3821 |
| 2022/0382972 A1* | 12/2022 | El-Kurdi | G06F 40/47 |
| 2023/0023630 A1* | 1/2023 | Hamilton | G06N 20/00 |
| 2023/0044266 A1* | 2/2023 | Nguyen | G06F 16/90335 |
| 2023/0059494 A1* | 2/2023 | Hunter | G06F 40/279 |
| 2023/0061731 A1* | 3/2023 | Sengupta | G06N 3/045 |
| 2023/0077338 A1* | 3/2023 | Mukund | G06F 40/279 |
| | | | 704/3 |
| 2023/0090601 A1* | 3/2023 | Benke | G06F 40/30 |
| | | | 704/9 |
| 2023/0112369 A1* | 4/2023 | Chopra | G06N 3/044 |
| | | | 705/304 |
| 2023/0116515 A1* | 4/2023 | Kanagovi | G06F 40/295 |
| | | | 704/9 |
| 2023/0134798 A1* | 5/2023 | Hoang | G06N 3/08 |
| | | | 704/9 |
| 2023/0136726 A1* | 5/2023 | Chew | G06V 30/416 |
| | | | 704/9 |
| 2023/0153641 A1* | 5/2023 | Manda | G06F 40/295 |
| | | | 707/603 |
| 2023/0186023 A1* | 6/2023 | Saillet | G06F 16/93 |
| | | | 704/9 |
| 2023/0186351 A1* | 6/2023 | Dhamija | G06Q 30/0276 |
| | | | 705/14.72 |
| 2023/0214506 A1* | 7/2023 | Narayan | G06F 21/604 |
| | | | 726/1 |
| 2023/0222100 A1* | 7/2023 | Harutyunyan | G06F 16/1744 |
| | | | 707/821 |
| 2023/0259540 A1* | 8/2023 | Das | G06F 16/3344 |
| | | | 704/9 |
| 2023/0267274 A1* | 8/2023 | Avadhani | G06F 18/22 |
| | | | 704/243 |
| 2023/0274287 A1* | 8/2023 | Blaikie, III | H04L 9/3239 |
| | | | 705/50 |
| 2023/0281208 A1* | 9/2023 | Nalliakodan | G06F 16/2282 |
| | | | 707/723 |
| 2023/0291731 A1* | 9/2023 | O'Neill | H04L 63/0853 |
| 2023/0307115 A1* | 9/2023 | Kumar | G06F 40/30 |
| 2023/0342849 A1* | 10/2023 | Doney | G06Q 40/04 |
| 2023/0353575 A1* | 11/2023 | Chandra | H04L 63/08 |
| 2023/0360643 A1* | 11/2023 | Mittal | G06N 3/045 |
| 2023/0385965 A1* | 11/2023 | Jacobson | G06Q 50/16 |
| 2023/0394168 A1* | 12/2023 | Chintalapati | G06F 21/6245 |
| 2023/0394235 A1* | 12/2023 | Rahman | G06F 40/242 |
| 2024/0005097 A1* | 1/2024 | Jung | G06F 40/284 |
| 2024/0054287 A1* | 2/2024 | Li | G06F 16/353 |
| 2024/0069882 A1* | 2/2024 | Pergal | G06F 8/61 |
| 2024/0106776 A1* | 3/2024 | Livne | G06F 40/126 |
| 2024/0179003 A1* | 5/2024 | Bayon | H04L 9/0869 |
| 2024/0265597 A1* | 8/2024 | Sabbarwal | G06F 3/1208 |
| 2024/0281765 A1* | 8/2024 | Bowen | G06Q 10/10 |

* cited by examiner

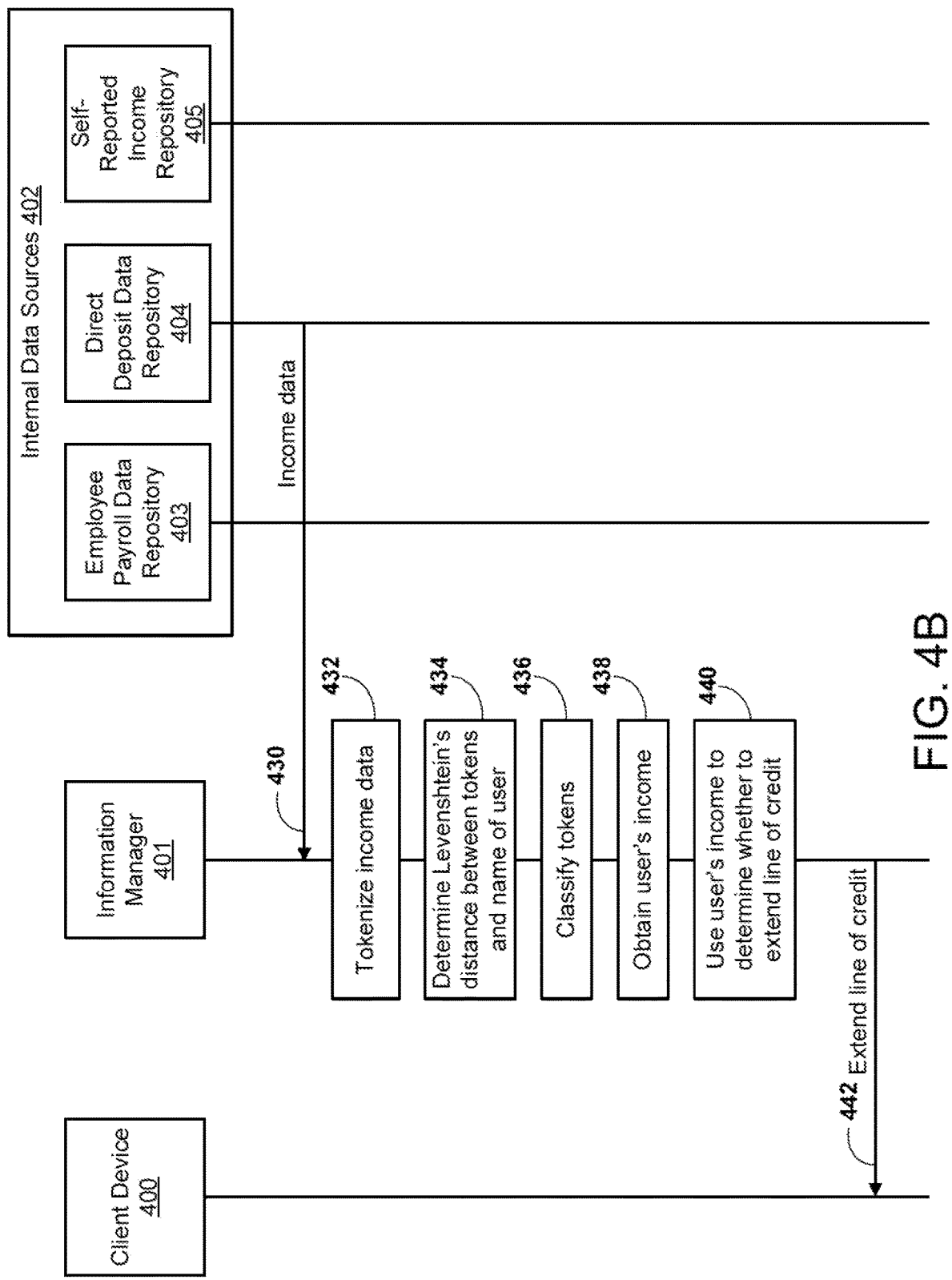

| Name | Transaction Description |
|---|---|
| Data of Interest 500: Jane Peterson | Transaction 501: Direct Deposit Jane Peterson 03022022 |
| | Transaction 502: Direct Deposit John Peterson 03152022 |
| | Transaction 503: Direct Deposit Jane Peterson 03152022 |

FIG. 5A

| Token 504 | Token 505 | Token 506 | Token 507 | Token 508 |
|---|---|---|---|---|
| Direct Deposit | Jane Peterson | 03022022 | John Peterson | 03152022 |

| Name | Transaction Description |
|---|---|
| Data of Interest 500: Jane Peterson | Transaction 501: Direct Deposit Jane Peterson 03022022 |
| | Transaction 502: Direct Deposit John Peterson 03152022 |
| | Transaction 503: Direct Deposit Jane Peterson 03152022 |

FIG. 5B

SYSTEM AND METHODS FOR CLASSIFICATION OF UNSTRUCTURED DATA USING SIMILARITY METRICS

BACKGROUND

Modern systems may make decisions based on data obtained from a variety of data sources. Some data sources may include unstructured data with relevant data intermixed with extraneous data. Data obtained from an unstructured data set may not distinguish between relevant and extraneous data. Utilizing relevant data and extraneous data from an unstructured data set may introduce inaccuracies that may jeopardize the quality of decisions and/or services based on the data.

BRIEF SUMMARY

Communication systems facilitate a broad array of interactions between computer systems and users thereof. As part of these interactions, the computer systems may obtain data from data sources. Some data sources may be preferred due to a low computational cost and/or low security risk associated with obtaining the data. However, the preferred data source may include unstructured data including both relevant and extraneous data. Decisions made and/or services provided based on this unstructured data may be inaccurate due to the presence of extraneous data.

To increase the accuracy of decisions and/or services based on unstructured data, relevant data may be extracted using natural language processing (NLP). Systems, apparatuses, methods, and computer program products are disclosed herein for performing NLP in order to extract relevant data from unstructured data.

To perform NLP on unstructured data, a system may tokenize the unstructured data by identifying logical units of text and assigning tokens based on the logical units of text. An identifier may be established, the identifier being text associated with the relevant data. In order to extract relevant data, a similarity metric may be determined between each token and the identifier. The similarity metric may be a Levenshtein's distance between the token and the identifier. A threshold may be established in order to classify each token as "similar" or "dissimilar" to the identifier associated with the relevant data. Any token with a similarity metric below this threshold may be classified as "similar" to the identifier and any token with a similarity metric above this threshold may be classified as "dissimilar" to the identifier.

Following classification of the tokens, each token classified as "similar" may be identified and the portions of the unstructured data associated with the tokens classified as "similar" may be collected to obtain all relevant data from the unstructured data set. This relevant data may then be used to make decisions and/or provide services to users of client devices throughout a distributed system.

In one example embodiment, a method is provided for decision making that relies upon relevant data that is intermixed with extraneous data in a data structure. The method may include identifying, by a data management circuitry of an information manager, a data requirement event for the relevant data. The method may also include obtaining, by communication hardware of the information manager, the data structure in response to the event. The method may also include tokenizing, by the data management circuitry, the data structure. The method may also include determining, by the data management circuitry, a similarity metric for each token of the tokens, the similarity metric for each token being based on: an identifier associated with the relevant data, and the token. The method may also include classifying, by the data management circuitry, each token of the tokens based on the similarity metric. The method may also include obtaining, by the data management circuitry, the relevant data based on the classified tokens. The method may also include performing, by a services circuitry, and action set based on the relevant data.

The identifier associated with the relevant data may include a name of a person associated with the data requirement event.

The relevant data may include indicators of financial income of the person associated with the data requirement event.

The extraneous data may include indicators of financial income for a second person (e.g., a person not associated with the data requirement event).

The data structure may include a log of deposits to a financial account associated with the person.

The data structure may include descriptions of transactions with the financial account, the descriptions being unstructured data, the descriptions including the indicators of the financial income of the person and the indicators of the financial income of the second person.

Tokenizing the data structure may include: identifying, by the data management circuitry, a text sequence in the data structure; determining, by the data management circuitry, logical units in the text sequence; and assigning, by the data management circuitry, tokens based on the logical units.

Determining a similarity metric for each token of the tokens may include: obtaining, by the data management circuitry, a token of the tokens; obtaining, by the data management circuitry, the identifier associated with the relevant data; and determining, by the data management circuitry, the similarity metric between the token of the tokens and the identifier.

The similarity metric may be a Levenshtein's distance between the identifier associated with the relevant data and the token.

Classifying each token of the tokens based on the similarity metric may include: identifying, by the data management circuitry, a threshold for the similarity metric; making a determination, by the data management circuitry, that a similarity metric falls below the threshold; and classifying, by the data management circuitry, the similarity metric as similar.

Classifying the similarity metric as similar may include: identifying, by the data management circuitry, the token of the tokens associated with the similarity metric; making a second determination, by the data management circuitry, that the token associated with the similarity metric matches the relevant data; classifying, by the data management circuitry, the token associated with the similarity metric as similar.

Classifying the tokens may include: identifying, by the data management circuitry, a threshold for the similarity metric; making a determination, by the data management circuitry, that a similarity metric falls above the threshold; and classifying, by the data management circuitry, the similarity metric as dissimilar.

Classifying the similarity metric as dissimilar may include: identifying, by the data management circuitry, the token associated with the similarity metric; making a determination, by the data management circuitry, that the token associated with the similarity metric does not match the relevant data; classifying, by the data management circuitry, the token associated with the similarity metric as dissimilar.

Obtaining the relevant data based on the classified tokens may include: identifying, by the data management circuitry, the tokens classified as similar; identifying, by the data management circuitry, the relevant data associated with the tokens classified as similar; and obtaining, by the data management circuitry, a sum of the relevant data associated with the tokens classified as similar.

In another example embodiment, an information manager is provided. The information manager may include a data management circuitry of the information manager configured to identify a data requirement event for the relevant data. The information manager may also include communication hardware of the information manager configured to obtain the data structure in response to the event. The information manager may also include the data management circuitry being further configured to tokenize the data structure. The information manager may also include the data management circuitry being further configured to determine a similarity metric for each token of the tokens, the similarity metric for each token being based on: an identifier associated with the relevant data, and the token. The information manager may also include the data management circuitry being further configured to classify each token of the tokens based on the similarity metric. The information manager may also include the data management circuitry being further configured to obtain the relevant data based on the classified tokens. The data manager may also include a services circuitry of the information manager configured to perform an action set based on the relevant data.

The foregoing brief summary is provided merely for purposes of summarizing some embodiments disclosed herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain embodiments in general terms above, reference will now be made to the accompanying drawings, which are not necessarily drawn to scale. Some embodiments may include fewer or more components than those shown in the figures.

FIGS. 4A-4B illustrate example operations of a system, in accordance with some example embodiments described herein.

FIGS. 5A-5C illustrate an example unstructured data set in some example embodiments described herein.

DETAILED DESCRIPTION

Figure 1:
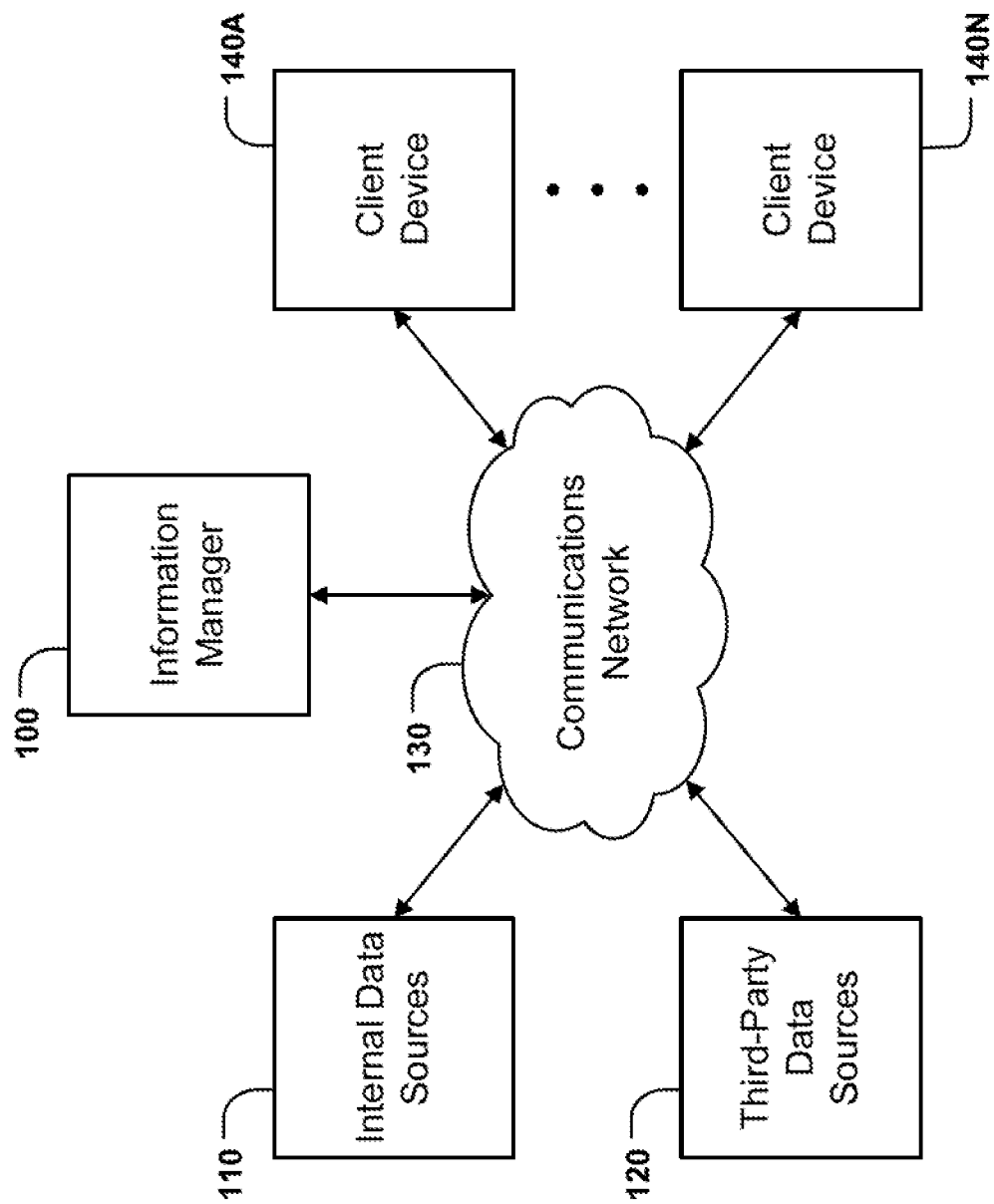
FIG. 1 illustrates a system in which some example embodiments may be used for obtaining data from data sources.

Some embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" is used to refer to any computing device capable of functioning as a server, such as a master exchange server, web server, mail server, document server, or any other type of server. A server may be a dedicated computing device or a server module (e.g., an application) hosted by a computing device that causes the computing device to operate as a server.

Overview

As noted above, example embodiments described herein provide methods, apparatuses, systems, and computer program products are described herein that provide for obtaining data from data sources throughout a distributed system. Some data sources may be preferred over other data sources for a particular implementation due to the security risk and/or the cost (e.g., computational cost, financial cost, etc.) of obtaining the data from each data source. Although a data source may be preferred for a particular implementation, the data obtained from the data source may be unstructured data including both relevant data (e.g., data relevant to the implementation) and extraneous data (e.g., data not relevant to the implementation). Prior to making decisions and/or providing a service based on the data, relevant data may be extracted from the unstructured data. By doing so, the decisions and services may be based on more accurate data and, therefore, may be of higher quality to clients.

To obtain relevant data from unstructured data, embodiments may provide for natural language processing (NLP) of the unstructured data. NLP may be implemented by tokenizing the unstructured data to obtain a series of tokens. Each token may be compared to an identifier, the identifier being text associated with the relevant data. For example, the identifier may be a name of a person and the unstructured data may be a log of deposits to a financial account. The log of deposits may include descriptions of transactions and indicators of financial income associated with the person (the person associated with the identifier and, therefore, the relevant data) and descriptions of transactions and indicators of financial income associated with a second person (extraneous data). Consequently, utilizing all indicators of financial income included in the financial account may overstate the financial income of the person.

In order to obtain an accurate representation of the financial income of the person, relevant data may be extracted from the log of deposits. The log of deposits may contain descriptions of transactions with the financial account. By tokenizing the descriptions of transactions, tokens associated with the name of the person may be identified via determining a similarity metric between each token and the name of the person. The similarity metric may be a Levenshtein's distance between each token and the name of the person. In addition, a threshold may be established in order to classify the similarity metric as "similar" or "dissimilar" to the name of the person.

Although a high-level explanation of the operations of embodiments has been provided above, specific details regarding the configuration of such embodiments are provided below.

System Architecture

Example embodiments disclosed herein may be implemented using any number and type of computing devices. To this end, FIG. 1 illustrates an example environment within which various embodiments may operate. As illustrated, the environment may include information manager 100, internal data sources 110, third-party data sources 120, and any number of client devices 140A-140N. These devices may interact with one another to obtain data from data sources throughout a distributed system. The data may be unstructured data, and may include both relevant and extraneous data. Relevant data may be isolated from extraneous data via natural language processing (NLP) and subsequently used to make decisions and/or provide services to users of client devices 140A-140N.

As used herein, the term information manager refers to a device that extracts relevant data from unstructured data via NLP. The term internal data source refers to a device that stores data associated with users of client devices (e.g., client devices 140A-140N). The internal data source may be operated by an organization that also operates the information manager and, therefore, the information manager and internal data source may have access to one or more shared networks. Similarly, the term third-party data source refers to a device that stores data associated with users of client devices (e.g., client devices 140A-140N). The third-party data source may not be operated by the organization that operates the information manager and internal data source. Therefore, the third-party data source may not have access to the one or more shared networks. The term client device refers to a device operated by a user in order to receive computer-implemented services based on the data obtained by the information manager. Any device may be an information manager, internal data source, third-party data source, and/or client device (for example, a device may both store internal data and extract relevant data) depending on their role, which may change over time.

The information manager 100 may be implemented using any number (one, many, etc.) and types of computing devices known in the art, such as desktop or laptop computers, tablet devices, smartphones, or the like. The information manager 100 may be associated with corresponding users (e.g., administrators, customers, representatives, other persons, etc.) that use the information manager 100 to interact with one or more of the client devices 140A-140N.

The users and/or applications hosted by the information manager 100 may provide computer-implemented services to client devices 140A-140N when interacting with them (and/or other devices). In order to provide the computer-implemented services, the information manager 100 may obtain data associated with a user of the client devices 140A-140N from internal data sources, third-party data sources, and/or other data sources. The data obtained from the data source may be unstructured data and may include both relevant and extraneous data. The information manager 100 may utilize NLP to extract relevant data from the unstructured data.

The internal data sources 110 may be implemented using any number and types of computing devices known in the art, such as desktop or laptop computers, tablet devices, smartphones, or the like. The internal data sources 110 may store data associated with users of client devices 140A-140N (and/or other users) and may be operated by an organization that also operates the information manager 100. Therefore, the information manager 100 may access the data stored in the internal data sources 110 via one or more shared networks. By doing so, the information manager 100 may obtain data without incurring a security risk associated with third-party data sources.

For example, the users of the client devices 140A-140N may be banking clients and the internal data sources 110 may be hosted by a bank and may include income data gathered via various methods. The internal data sources 110 may include an employee data repository, a direct deposit data repository, a self-reported income repository, and/or other data repositories. The employee payroll data repository may include income data associated with employees of the bank sourced directly from the bank's payroll. The data in the employee payroll data repository may be considered both accurate and secure. The direct deposit data repository may include income data sourced from bank accounts associated with the banking clients. However, the bank accounts may be joint accounts and may include direct deposit data associated with multiple users. Obtaining all direct deposit data from a user's bank account may not provide an accurate representation of the user's income. The self-reported income repository may include income data provided by users when participating in or requesting financial services from the bank (e.g., surveys, loans, credit applications, etc.). Obtaining income data from the self-reported income repository may be less accurate than the employee payroll data repository and the direct deposit data repository, as users may make mistakes when entering their income. The internal data sources 110 may be operated by the same organization as the information manager 100 and, therefore, obtaining data from the internal data sources 110 may pose less of a security risk than obtaining data from third-party data sources 120.

The third-party data sources 120 may be implemented using any number and types of computing devices known in the art, such as desktop or laptop computers, tablet devices, smartphones, or the like. The third-party data sources 120 may store data associated with users of client devices 140A-140N (and/or other users) and the third-party data sources 120 may be hosted by any entity outside of the network shared by the information manager 100 and the internal data sources 110. For example, the information manager 100 may access the data stored in the third-party data sources 120 when the desired data is not available from one of the internal data sources 110. Data may be obtained from the third-party data sources 120 for other reasons and/or under other circumstances without departing from embodiments disclosed herein.

The client devices 140A-140N may be implemented using any number and types of computing devices known in the art, such as desktop or laptop computers, tablet devices, smartphones, or the like. The client devices 140A-140N may provide computer-implemented services and/or receive computer-implemented services from the information manager 100 and/or other devices. The client devices 140A-140N may be associated with corresponding users (e.g., administrators, customers, representatives, other persons, etc.) that use the client devices 140A-140N to interact with the information manager 100 (and/or other devices). The client devices 140A-140N may be independent devices, or may in some embodiments be peripheral devices communicatively coupled to other computing devices. The users and/or applications hosted by the client devices 140A-140N may receive computer-implemented services based on the data obtained by the information manager 100 (and/or other devices).

To facilitate communications, any of the devices shown in FIG. 1 may be operably connected to each other with communications network 130. Communications network 130 may facilitate communications with one or more wired and/or wireless networks implemented using any suitable communications technology. In an embodiment, the communications network 130 may include multiple networks, some of which may be shared by one or more devices throughout the distributed system. For example, information manager 100 and the internal data sources 110 may be hosted by the same organization and, therefore, may operate on a shared network. This shared network may facilitate secure transmissions of data between information manager 100 and internal data sources 110.

Although FIG. 1 illustrates an environment and implementation in which various functionalities are performed by different devices, in some embodiments some or all of the functionalities of the information manager 100, internal data sources 110, third-party data sources 120, and client devices 140A-140N may be aggregated into a single device.

Example Implementing Apparatuses

Figure 2:
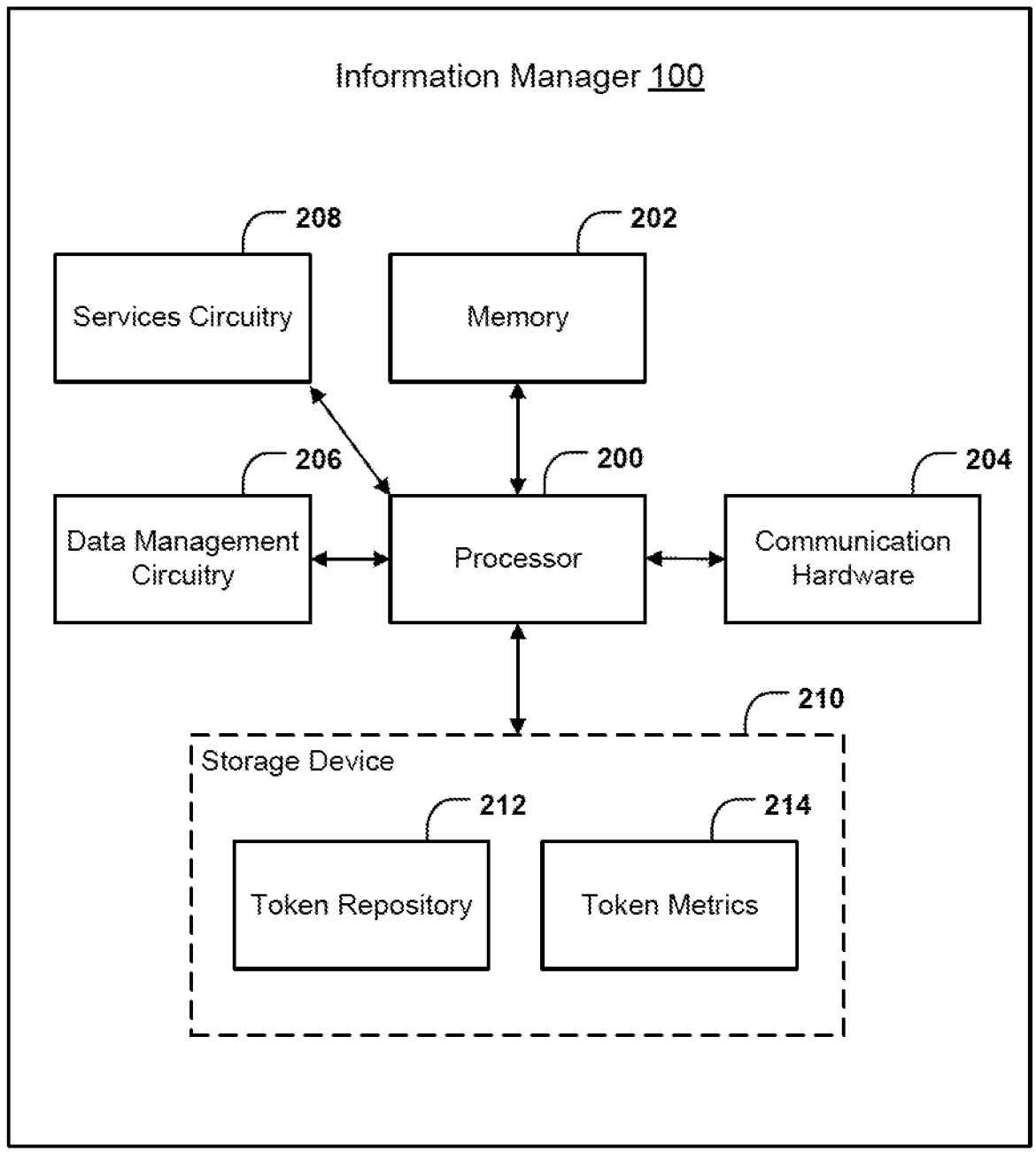
FIG. 2 illustrates a schematic block diagram of example circuitry embodying a device that may perform various operations in accordance with some example embodiments described herein.

Turning to FIG. 2, the information manager 100 may be embodied by one or more computing devices or servers. As illustrated in FIG. 2, the information manager 100 may include processor 200, memory 202, communication hardware 204, data management circuitry 206, services circuitry 208, and storage device 210, each of which will be described in greater detail below. While the various components are only illustrated in FIG. 2 as being connected with processor 200, it will be understood that the information manager 100 may further comprise a bus (not expressly shown in FIG. 2) for passing information amongst any combination of the various components of the information manager 100. The information manager 100 may be configured to execute various operations described above in connection with FIG. 1 and below in connection with FIGS. 3A-5C.

The processor 200 (and/or co-processor or any other processor assisting or otherwise associated with the processor) may be in communication with the memory 202 via a bus for passing information amongst components of the apparatus. The processor 200 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the information manager 100, remote or "cloud" processors, or any combination thereof.

The processor 200 may be configured to execute software instructions stored in the memory 202 or otherwise accessible to the processor (e.g., software instructions stored on a separate or integrated storage device 210). In some cases, the processor may be configured to execute hard-coded functionality. As such, whether configured by hardware or software methods, or by any combination of hardware with software, the processor 200 represents an entity (e.g., physically embodied in circuitry) capable of performing operations according to various embodiments of the present invention while configured accordingly. Alternatively, as another example, when the processor 200 is embodied as an executor of software instructions, the software instructions may specifically configure the processor 200 to perform the algorithms and/or operations described herein when the software instructions are executed.

Memory 202 is non-transitory and may include, for example, one or more volatile and/or non-volatile memories. In other words, for example, the memory 202 may be an electronic storage device (e.g., a computer readable storage medium). The memory 202 may be configured to store information, data, content, applications, software instructions, or the like, for enabling the apparatus to carry out various functions in accordance with embodiments described herein.

The communication hardware 204 may be any means such as a device or circuitry embodied in either hardware or a combination of hardware and software that is configured to receive and/or transmit data from/to a network and/or any other device, circuitry, or module in communication with the information manager 100. In this regard, the communication hardware 204 may include, for example, a network interface for enabling communications with a wired or wireless communication network. For example, the communication hardware 204 may include one or more network interface cards, antennas, buses, switches, routers, modems, and supporting hardware and/or software, or any other device suitable for enabling communications via a network. Furthermore, the communication hardware 204 may include the processing circuitry for causing transmission of such signals to a network or for handling receipt of signals received from a network.

In addition, information manager 100 further comprises data management circuitry 206 configured to obtain data from a data source throughout a distributed system and extract relevant data (if necessary) from the data. The data management circuitry 206 may determine a data source from which to obtain the data. In the event that the data management circuitry 206 obtains unstructured data, the data management circuitry 206 may extract relevant data via NLP. In order to do so, the data management circuitry 206 may tokenize the unstructured data and store any number of tokens in token repository 212. Data management circuitry 206 may determine which tokens represent relevant data by comparing each token to an identifier associated with the relevant data. The comparison may be a similarity metric and/or other type of metric and may be stored in token metrics 214. Data management circuitry 206 may utilize processor 200, memory 202, or any other hardware component included in the information manager 100 to perform these operations, as described in connection with FIGS. 3A-5C below. The data management circuitry 206 may further utilize communication hardware 204 to obtain data from a variety of data sources (e.g., internal data sources 110, third-party data sources 120, and/or other data sources as shown in FIG. 1) and in some embodiments may utilize processor 200 and/or memory 202 to extract relevant data from unstructured data.

In addition, information manager 100 further comprises services circuitry 208 configured to provide any number of computer-implemented services in isolation or in cooperation with other devices operably connected to information manager 100. Services circuitry 208 may utilize processor 200, memory 202, or any other hardware component included in the information manager 100 to perform these operations, as described in connection with FIGS. 3A-5C below. The services circuitry 208 may further utilize communication hardware 204 to communicate with users of client devices (e.g., client devices 140A-140N) prior to, during, and/or after providing the computer-implemented services and in some embodiments may utilize processor 200 and/or memory 202 to facilitate providing the computer-implemented services.

Finally, information manager 100 may include storage device 210 that stores data structures used by the data management circuitry 206 to perform its functionality. Storage device 210 may be a non-transitory storage and include any number and types of physical storage devices (e.g., hard disk drives, tape drives, solid state storage devices, etc.) and/or control circuitry (e.g., disk controllers usable to operate the physical storage devices and/or provide storage functionality such as redundancy, deduplication, etc.). Storage device 210 may include token repository 212, token metrics 214, and/or other data structures as described below.

Token repository 212 may include any number of tokens obtained from data associated with users of client devices 140A-140N. Token repository 212 may include any type and quantity of tokens usable to identify relevant data intermixed with extraneous data. For example, the tokens of token repository 212 may include logical units of text (e.g., names, dates, etc.) extracted from a log of deposits to a financial account. The log of deposits to a financial account may include descriptions of transactions with the financial account. A description of the descriptions may include the following text: Direct Deposit Jane Peterson 031522. The tokens extracted from this text may include logical units of text such as "Direct Deposit," "Jane Peterson," and "031522." The tokens of token repository 212 may be generated and/or obtained by the information manager 100 via other methods without departing from embodiments disclosed herein. Token repository 212 may be implemented using any number and types of data structure (e.g., database, lists, tables, linked lists, etc.).

Token metrics 214 may include any number of token metrics obtained by information manager 100. Token metrics 214 may include any type of metric including similarity metrics. Similarity metrics may be utilized to determine the similarity between each token in token repository 212 and an identifier, the identifier being text associated with relevant data. For example, the similarity metric may be a Levenshtein's distance between each token and the identifier and token metrics 214 may include any number of Levenshtein's distances. The Levenshtein's distances may include associated classifications, the classifications indicating whether the Levenshtein's distances fall above or below a threshold for similarity with the identifier. For example, the classifications may include "similar" and "dissimilar," with a "similar" classification indicating a Levenshtein's distance below the threshold and a "dissimilar" classification indicating a Levenshtein's distance above the threshold.

In an embodiment, token metrics 214 may include the following Levenshtein's distances: (0.5, 1.0, 0.0, 0.5, 1.5, 5.0, 3.5, 6.0). The threshold for Levenshtein's distances may be 0.5, with any Levenshtein's distance above 0.5 being classified as "dissimilar" to the identifier and any Levenshtein's distance of 0.5 or below being classified as "similar" to the identifier. Therefore, the tokens associated with the first, third, and fourth Levenshtein's distances listed above (0.5, 0.0, 0.5) may be classified as "similar" to the identifier. The Levenshtein's distances may be calculated in order to determine which tokens from token repository 212 may match the relevant data. The identifier may be a name and tokens with a Levenshtein's distance of 0.5 or below may include tokens with text similar to the name. Therefore, the Levenshtein's distances may be utilized in order to select text entries in a data structure associated with a person's name.

Example Apparatus Operations for Obtaining and Classifying Data

Turning to FIGS. 3A-3D, example flowcharts are illustrated that include example operations implemented by various embodiments described herein. FIGS. 3A-3D illustrate example operations for obtaining relevant data from a data source and making decisions based on the relevant data.

The operations illustrated in FIGS. 3A-3D may, for example, be performed by information manager 100 shown in FIG. 1, and which is also shown and described in connection with FIG. 2. To perform the operations described below, the information manager 100 may utilize one or more of processor 200, memory 202, communication hardware 204, data management circuitry 206, services circuitry 208, storage device 210, and/or any combination thereof.

Figure 3A:
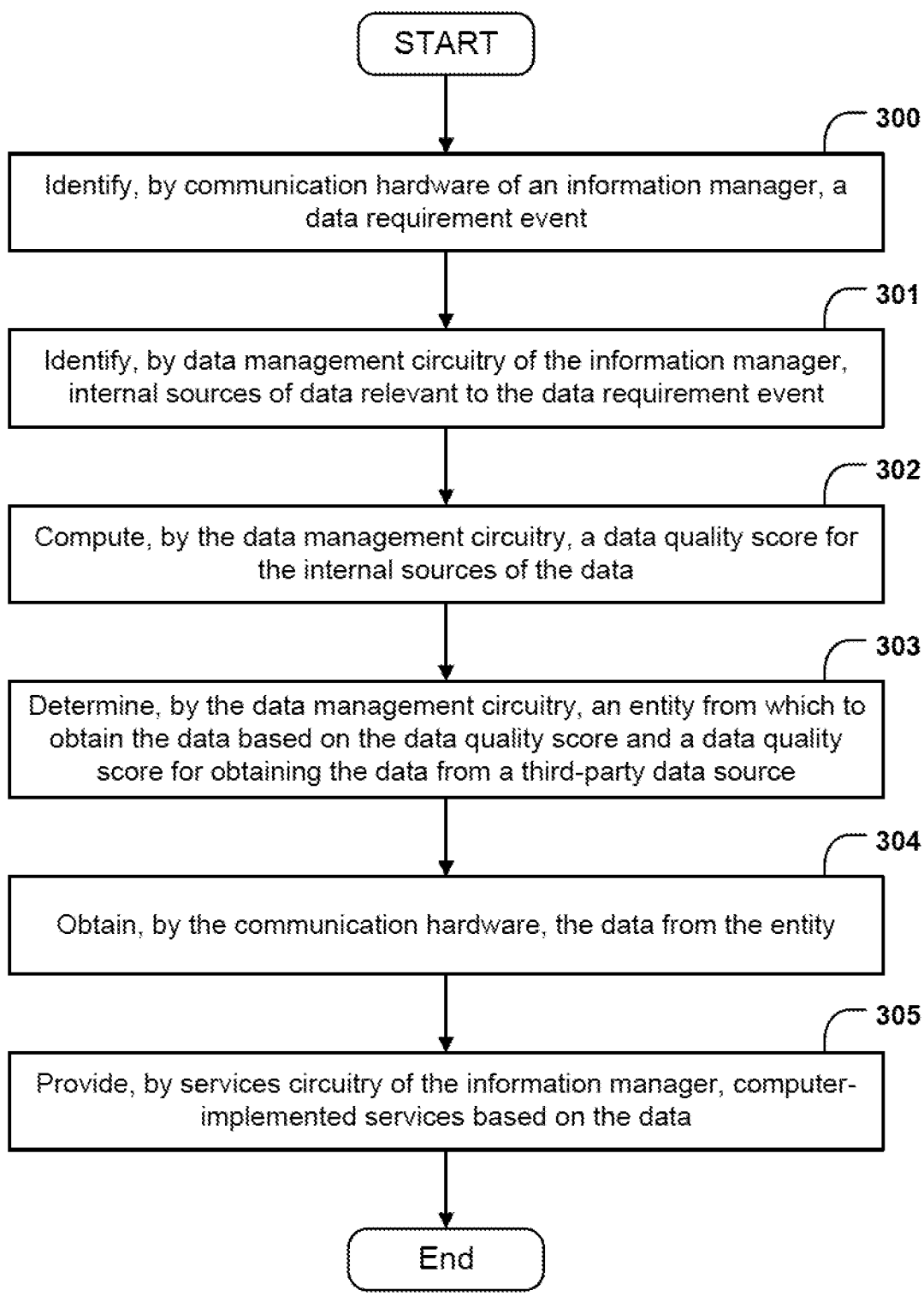
FIG. 3A illustrates an example flowchart for obtaining data from a preferred data source, in accordance with some example embodiments described herein.

Turning first to FIG. 3A, example operations are shown for obtaining data from a preferred data source. Prior to obtaining the data, information manager 100 may determine a preferred data source by assigning a data quality score to any number of data sources. The data quality score may indicate the computational resources required and the security risk associated with obtaining the data from the data source.

As shown by operation 300, information manager 100 includes means, such as a processor, memory, and a communication hardware, or the like, for identifying a data requirement event. The data requirement event may be identified by receiving a request for computer-implemented services from a client device (e.g., client device 140A). For example, a user of client device 140A may request computer-implemented services by submitting a request for a new line of credit from a bank. In this example, identifying a data requirement event may include an authentication process in order to confirm the identity of the user requesting the line of credit. The authentication process may include a single-factor or multi-factor authentication process and may involve a password, pin, biometric factor, and/or other factor.

In an embodiment, the information manager 100 may identify a data requirement event without receiving a request from another device throughout the distributed system. For example, the information manager 100 may obtain data in order to update, renew, and/or suggest a computer-implemented service for a user of a client device (e.g., client device 140A). The data requirement event may be other events without departing from embodiments disclosed herein.

As shown by operation 301, information manager 100 includes means, such as a processor, memory, and a data management circuitry, or the like, for identifying internal sources of data relevant to the data requirement event. Internal sources of data (e.g., internal data sources 110) may be hosted by the same entity (and, therefore, on a shared network with) the information manager 100. The internal data sources 110 may store income data associated with users of client devices 140A-140N and may include an employee payroll data repository, a direct deposit data repository, a self-reported income repository, and/or other data repositories.

In an embodiment, the information manager 100 may identify internal sources of data relevant to the data requirement event by sending a request to the internal data sources 110 to determine which of the internal data sources 110 may store the desired data. For example, the information manager 100 may transmit a request for income data related to a user of a client device 140A. The response from the internal data sources 110 may include a list of the internal data sources that store the income data associated with the user. The list may include, for example, the direct deposit data repository and the self-reported income repository.

In an embodiment, information manager 100 may identify internal sources of data relevant to the data requirement event using a prioritized sequence of requests. For example, the information manager 100 may rank the internal sources of data based on accuracy and accessibility of data for a given implementation and may send individualized requests to the internal data sources 110 in order of the ranking. For additional information regarding identifying internal sources of data, refer to FIG. 3B.

As shown by operation 302, information manager 100 includes means, such as a processor, memory, and a data management circuitry, or the like, for computing a data quality score for the internal sources of the data. Data quality scores may be used to determine a preferred data source of the internal data sources 110 for obtaining data. Data quality scores may include a computational metric (a representation of the quantity of computing resources needed to obtain the data) and a security metric (a representation of the security risk associated with obtaining the data). The computational metric may be determined by multiplying the quantity of computing resources required to access the data by a weighting factor. The security metric may be determined by a security ranking for the sources of data, with a lower security ranking indicating a higher level of security and a higher security ranking indicating a lower level of security.

For example, the internal data sources 110 may include an employee payroll data repository, a direct deposit data repository, and a self-reported income repository, as previously described with relation to FIG. 1. Obtaining data from the employee payroll data repository may consume 200 units of computing resources. In addition, the employee payroll data repository may be considered a low-risk data source and, therefore, may have a security ranking of 1 (on a scale of 1 to 5 with 1 being the most secure and 5 being the least secure). The data quality score associated with the employee payroll data repository may be calculated using the following formula: data quality score=(quantity of computing resources)*(weighting factor)+security ranking. In order to calculate the data quality score, the quantity of computing resources may be multiplied by a weighting factor of 0.01 to yield a computational metric of 2. The data quality score may be calculated by adding the computational metric and the security metric, which may result in a data quality score of 3 for the employee payroll data repository.

In contrast, obtaining data from the self-reported income repository may consume 300 units of computing resources and, therefore, may have a computational metric of 3. However, the self-reported income repository may have a security ranking of 3 and, therefore, a data quality score of 6. In this example, the information manager 100 may select the employee payroll data repository as the preferred data source for the given implementation (assuming a lower data quality score is a preferred data quality score). Data quality scores may be calculated via other methods and considering other parameters without departing from embodiments disclosed herein.

In an embodiment, data quality scores may be computed by the information manager 100 using an internal data lookup table to determine the quantity of computing resources required and the security ranking associated with each of the internal data sources 110. Alternatively, data quality scores may be computed by another entity (e.g., a second information manager) and obtained by information manager 100.

As shown by operation 303, information manager 100 includes means, such as a processor, memory, and a data management circuitry, or the like, for determining an entity from which to obtain the data based on the data quality score and a data quality score for obtaining data from a third-party source. Data quality scores may be computed for internal data sources 110 as described above. Data quality scores may be computed for third-party sources using similar parameters (e.g., a computational metric and a security ranking). There may be a financial cost associated with obtaining data from a third-party source, and the financial cost may be integrated into the computational metric.

In an embodiment, data quality scores may be determined for third-party sources based on the financial cost associated with obtaining the data from the third-party source. For example, the cost of obtaining a client's income from a third-party data source may be $3.00. In order to obtain a computational metric for the data source, the information manager 100 may convert the financial cost into a computational cost via a conversion factor of $0.01/unit of computing resources. Therefore, the computational cost may be 300 units of computing resources. The security ranking of a third-party data source may be lower than the internal data sources 110, as there may be increased risks associated with obtaining sensitive user data from a source outside the organization that operates the information manager 100 and the internal data sources 110. Therefore, the security ranking of the third-party data sources may be 5 (on a scale of 1 to 5 with 1 being the most secure and 5 being the least secure). Consequently, the data quality score for the third-party data source may be determined by multiplying the computing resources by the weighting factor of 0.01 and adding the security ranking. This formula results in a data quality score of 8 for the third-party source. Data quality scores for third-party data sources may be calculated via other methods and considering other parameters without departing from embodiments disclosed herein.

In an embodiment, information manager 100 may obtain the following data quality scores: (direct deposit data repository: 3, self-reported data repository: 4, third-party source: 8). In this example, a lower data quality score may indicate a preferred data source and the information manager 100 may determine the direct deposit data repository as the preferred data source for obtaining the desired data.

As shown by operation 304, information manager 100 includes means, such as a processor, memory, and communication hardware, or the like, for obtaining the data from the entity. The information manager 100 may determine the preferred source of data and send an individualized request to that data source for the data. Alternatively, the information manager 100 may transmit a data quality score ranking (e.g., direct deposit data repository: 3, self-reported data repository: 4, third-party source: 8) to another entity (e.g., a data quality score manager) and the data quality score manager (not shown) may obtain the data based on the data quality score ranking. The data quality score manager may then transmit the data to the information manager 100. Refer to FIG. 3D for additional details regarding obtaining data.

As shown by operation 305, information manager 100 includes means, such as a processor, memory, and a services circuitry, or the like, for providing computer-implemented services based on the data. The computer-implemented services may be provided using the data by performing actions based on the content of the data. For example, the data may be stored in memory, used to obtain other information (e.g., via computation), may be used to control programmatic flow of applications, and/or may be otherwise used by applications or other entities that provide the computer-implemented services.

The computer-implemented services may include, for example, providing a financial service to a user of a client device (e.g., client device 140A) and/or extending a financial product offer to the user of the client device based on the data. The financial services may include extending a new line of credit, offering a loan, etc. Refer to FIG. 3C for additional details regarding performing computer-implemented services based on the data.

The method may end following operation 305.

Figure 3B:
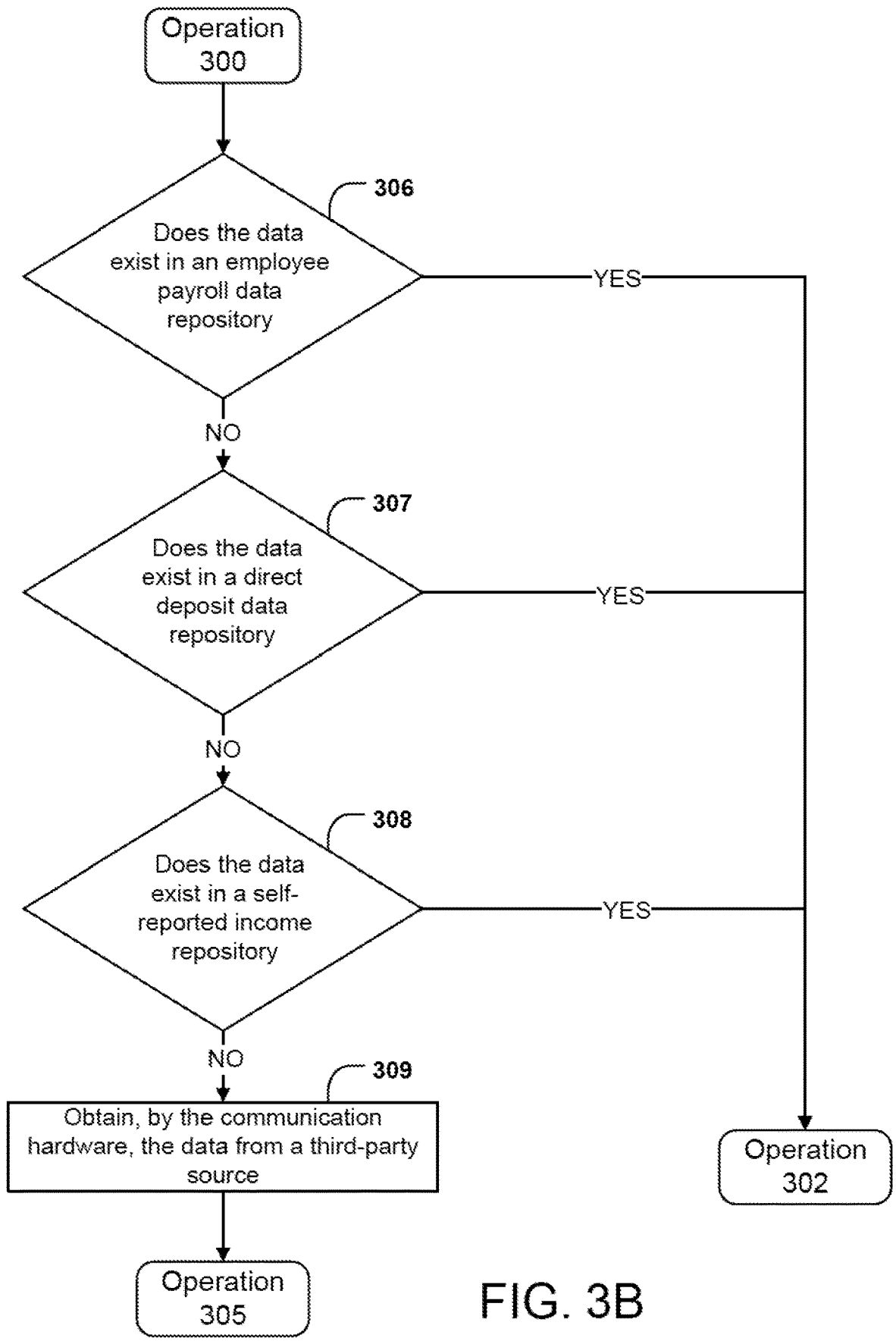
FIG. 3B illustrates an example flowchart for determining which internal sources of data may store the desired data for a given implementation, in accordance with some example embodiments described herein.
Figure 3C:
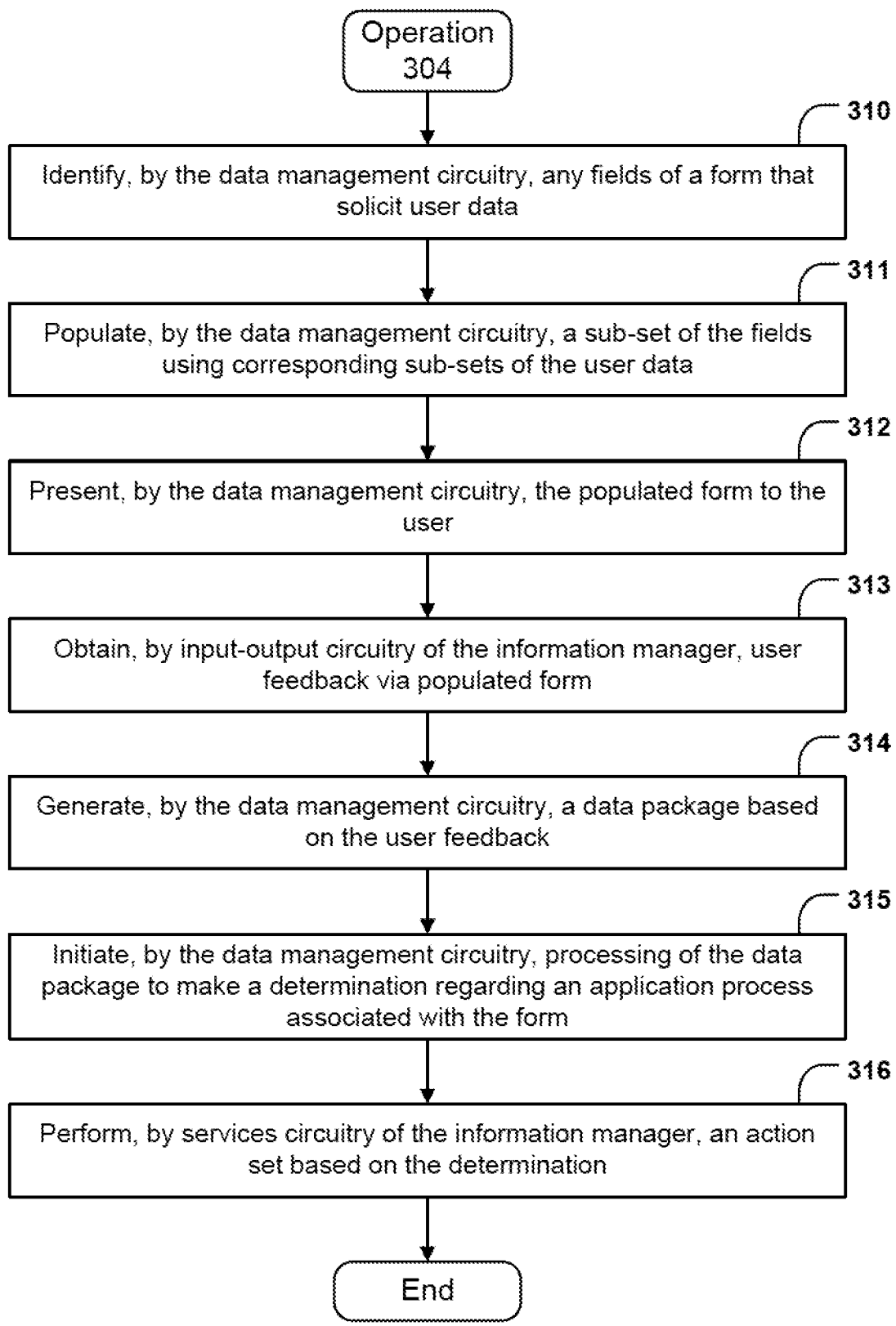
FIG. 3C illustrates an example flowchart for providing computer-implemented services to a user of a client device, in accordance with some example embodiments described herein.
Figure 3D:
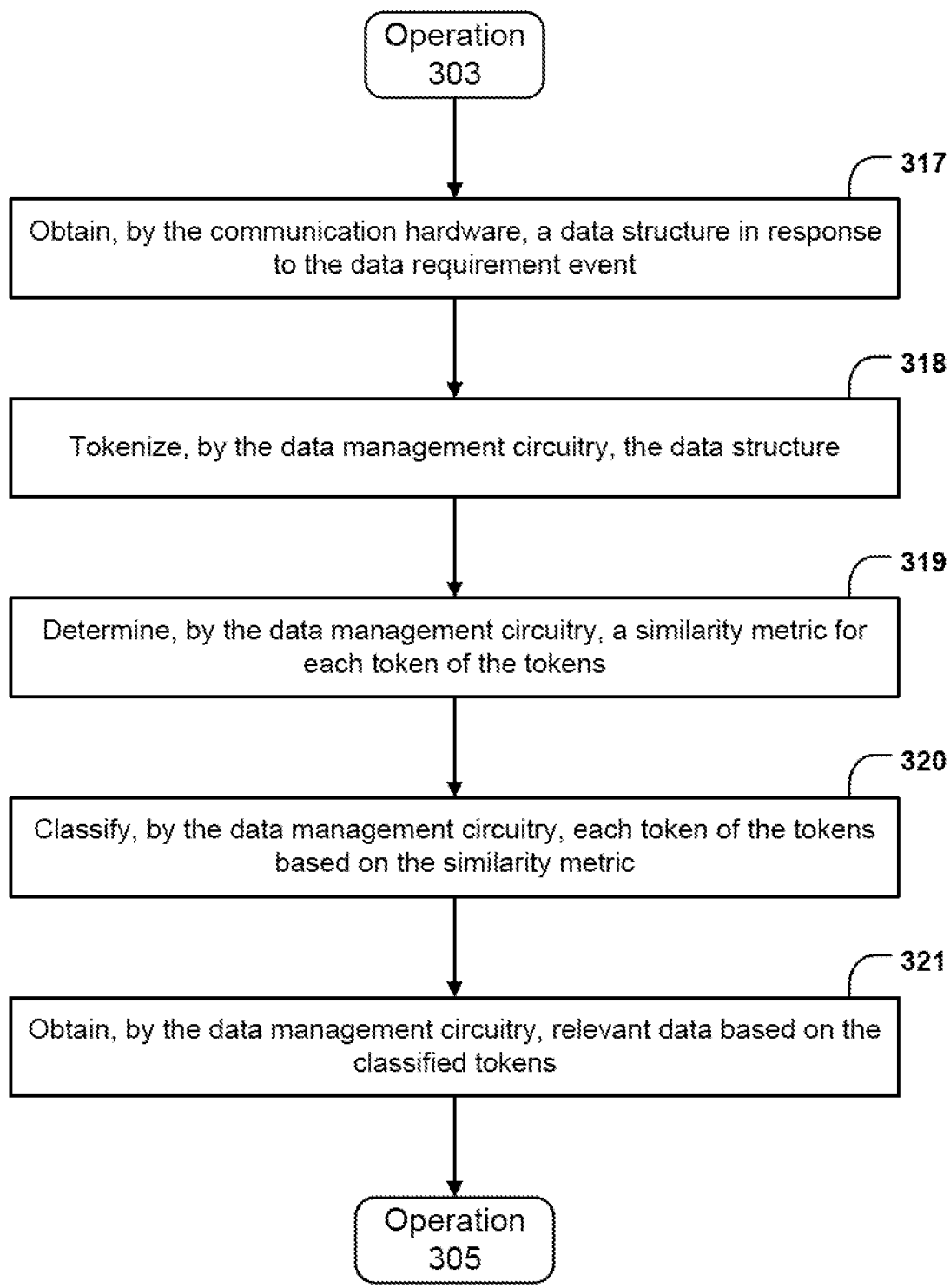
FIG. 3D illustrates an example flowchart for decision making based on relevant data that is intermixed with extraneous data in a data structure, in accordance with some example embodiments described herein.

Turning to FIG. 3B, example operations are shown for determining which internal sources of data may store the desired data for a given implementation. For example, the internal data sources 110 may include an employee payroll data repository, a direct deposit data repository, and a self-reported data repository. The information manager 100 may identify which internal data sources store the relevant data as described below. The operations shown in FIG. 3B may be an expansion of operation 301 in FIG. 3A.

As shown by operation 306, information manager 100 includes means, such as a processor, memory, and a data management circuitry, or the like, for determining whether the data exists in an employee payroll data repository. For example, the information manager 100 may be hosted by a bank and the employee payroll data repository may include income data associated with employees of the bank. This data may be considered both accurate and secure, as the bank may have the most updated information regarding the payroll of its employees and the information manager 100 may be able to obtain the data via a secure internal network.

In an embodiment, if the data exists in the employee payroll data repository, the method may proceed to operation 302. In this example, the information manager 100 may automatically determine the employee payroll data repository as the preferred data source and, therefore, may not need to determine whether the income data exists in the direct deposit data repository or the self-reported income repository. If the data does not exist in the employee payroll data repository, the method may proceed to operation 307. In a second example, the information manager 100 may solicit income data from each of the internal data sources 110 prior to proceeding to operation 302.

As shown by operation 307, information manager 100 includes means, such as a processor, memory, and a data management circuitry, or the like, for determining whether the data exists in a direct deposit data repository. For example, the information manager 100 may be hosted by a bank and the direct deposit data repository may include income data obtained from user's financial account with the bank. The direct deposit data repository may be considered accurate and secure, although potentially less accurate than the employee payroll data as the data does not come from the bank itself and joint accounts may inflate the total income of an individual. Obtaining data from the direct deposit data repository may pose a low security risk, as the information manager 100 may be able to obtain the data via a shared internal network.

In an embodiment, if the data exists in the direct deposit data repository, the method may proceed to operation 302. In this example, the information manager 100 may automatically determine the direct deposit data repository as the preferred data source and, therefore, may not need to determine whether the income data exists in the self-reported income repository. If the data does not exist in the direct deposit data repository, the method may proceed to operation 308. In a second example, the information manager 100 may solicit income data from each of the internal data sources 110 prior to proceeding to operation 302.

As shown by operation 308, information manager 100 includes means, such as a processor, memory, and a data management circuitry, or the like, for determining whether the data exists in a self-reported income repository. For example, the information manager 100 may be hosted by a bank and the self-reported income repository may include income data submitted by a user of client device 140A as part of a customer survey, application for financial services, and/or other self-reported sources. The self-reported income repository may be considered less accurate than the employee payroll data repository and the direct deposit data repository, as the data has been submitted by a user and has not been verified by another source. In addition, the user may make a mistake when entering their income. However, obtaining data from the self-reported income repository may pose a low security risk, as the information manager 100 may be able to obtain the data via a shared internal network.

In an embodiment, if the data exists in the self-reported income repository, the method may proceed to operation 302. In this example, the information manager 100 may automatically determine the self-reported income repository as the preferred data source. If the data does not exist in the self-reported income repository, the method may proceed to operation 309. In a second example, the information manager 100 may solicit income data from each of the internal data sources 110 prior to proceeding to operation 302.

As shown by operation 309, information manager 100 includes means, such as a processor, memory, and a data source management circuitry, or the like, for obtaining the data from a third-party source. Continuing with the above example, the third-party source may be another entity (e.g., an income verification service) utilized by the bank to obtain income data associated with users of client devices 140A-140N. In a first example, the information manager 100 may obtain data from a third-party source when no data is available from internal data sources 110. In a second example, the information manager 100 may obtain data from a third-party source for other reasons (e.g., to minimize consumption of computing resources). Obtaining data from a third-party source may pose a higher security risk than obtaining data from internal data sources 110, as the information manager 100 may not be able to obtain the data via a shared internal network.

The method may proceed to operation 305.

Turning to FIG. 3C, example operations are shown for providing computer-implemented services to a user of a client device (e.g., client device 140A). In this example embodiment, the computer-implemented services may include pre-populating a form associated with a computer-implemented service using data obtained via the operations shown in FIG. 3A. The operations shown in FIG. 3C may be an expansion of operation 305 in FIG. 3A. Therefore, in this example, the information manager 100 may have previously authenticated the user of the client device (e.g., client device 140A), obtained a request from the user to provide a computer-implemented service, obtained data associated with the user via the method described in FIGS. 3A-3B, and obtained a form associated with the requested computer-implemented service.

As shown by operation 310, information manager 100 includes means, such as a processor, memory, and a data management circuitry, or the like, for identifying any fields of a form that solicit user data. The form may include, for example, an application for a line of credit and the fields of the form that solicit user data may include the name, income, debt payments, assets, and the number of dependents associated with the user.

As shown by operation 311, information manager 100 includes means, such as a processor, memory, and a data management circuitry, or the like, for populating a sub-set of the fields using corresponding sub-sets of user data. The sub-set of user data may be obtained from internal data sources 110 and/or third-party data sources 120. The sub-set of user data may be obtained without user intervention via the methods described in FIGS. 3A-3B. Information manager 100 may make a comparison between the available sub-set of user data and the fields of the form to determine the sub-set of the fields. The information manager 100 may modify the sub-set of the fields based on the corresponding sub-sets of the user data.

For example, the sub-set of user data may include a user's income and a list of debt payments associated with the user. Therefore, the information manager 100 may populate the fields of the form soliciting the user's income and the list of the debt payments associated with the user. In this example, the sub-set of the fields may include the field soliciting income data and the field soliciting the list of the debt payments associated with the user.

In an embodiment, the information manager 100 may obtain the populated form (e.g., with a sub-set of the fields modified using the corresponding sub-set of the user data) from another entity (e.g., a second information manager) responsible for managing the sub-set of the data.

As shown by operation 312, information manager 100 includes means, such as a processor, memory, and a data management circuitry, or the like, for presenting the populated form to the user. In order to present the form to the user, the information manager 100 may generate a graphical user interface based on the populated form. The graphical user interface may highlight the sub-set of the fields and display the graphical user interface to the user. The sub-set of the fields may be highlighted by the information manager 100 in order to draw the attention of the user to the fields of the form that may have been modified based on the sub-set of the user data without user intervention.

As shown by operation 313, information manager 100 includes means, such as a processor, memory, and input-output circuitry, or the like, for obtaining user feedback via the populated form. The user feedback may indicate a change to the sub-sets of the user data and additional data that was not indicated by the populated form. For example, the user may provide feedback by editing the sub-set of the fields that was populated by the information manager 100 in order to ensure accuracy of the user data. In addition, the user may provide additional data in order to complete any empty fields of the form.

As shown by operation 314, information manager 100 includes means, such as a processor, memory, a data management circuitry, or the like, for generating a data package based on the user feedback. The data package may include the change to the sub-sets of the user data, the additional data that was not indicated by the populated form, and all of the sub-set of the user data that was not modified by the user via the user feedback.

As shown by operation 315, information manager 100 includes means, such as a processor, memory, a data management circuitry, or the like, for initiating processing of the data package to make a determination regarding an application process associated with the form. Processing the data package may include feeding the data package into an inference model trained to make a determination regarding a computer-implemented service given a set of user data as input data. For example, the data package may include a credit application and the user data in the application may include the name of the user, the income of the user, the debt associated with the user, the liabilities associated with the user, the quantity of dependents associated with a user, a location of a user, etc. This user data may be, for example, fed into an inference model trained to make a determination regarding whether to extend a line of credit based on the user data. Data packages may be processed via other methods without departing from embodiments disclosed herein.

As shown by operation 316, information manager 100 includes means, such as a processor, memory, a services circuitry, or the like, for performing an action set based on the determination. The action set may include, for example, providing or denying a computer-implemented service based on the previously described determination. Continuing with the above example, the action set may include extending a line of credit to the user of the client device (e.g., client device 140A) based on the user data provided in the form. The action set may include other actions without departing from embodiments disclosed herein.

The method may end following operation 316.

Turning to FIG. 3D, example operations are shown for decision making based on relevant data that is intermixed with extraneous data in a data structure. For example, data may be obtained from internal data sources 110 in order to minimize the computational cost and security risk associated with obtaining data from a third-party source as described above. However, the data obtained from the internal data sources 110 may be unstructured data and may include both relevant and extraneous data. In order to make accurate decisions and provide quality services based on the unstructured data, relevant data may be extracted from the unstructured data via NLP.

The operations shown in FIG. 3D may be an expansion of operation 304 shown in FIG. 3A. Therefore, it may be assumed that information manager 100 may have previously identified a data requirement event and identified a preferred data source via comparison of data quality scores amongst the available data sources. In this example, the preferred data source may be an internal data source such as the direct deposit data repository.

As shown by operation 317, information manager 100 includes means, such as a processor, memory, communication hardware, or the like for obtaining a data structure in response to the data requirement event. The data structure may be obtained from any of the internal data sources 110 and/or other data sources. The preferred data source may be determined via methods described in FIGS. 3A-3B. The data structure may include unstructured data with relevant data (e.g., data relevant to the data requirement event) intermixed with extraneous data (e.g., data not relevant to the data requirement event).

In an embodiment, the information manager 100 may determine the preferred data source and send an individualized request to the preferred data source for the data structure. Alternatively, the information manager 100 may transmit a data quality score ranking (e.g., direct deposit data repository: 3, self-reported data repository: 4, third-party source: 8) to another entity (e.g., a data quality score manager) and the data quality score manager (not shown) may obtain the data based on the data quality score ranking. The data quality score manager may then transmit the data to the information manager 100.

As shown by operation 318, information manager 100 includes means, such as a processor, memory, data management circuitry, or the like, for tokenizing the data structure. The data structure may include an unstructured text sequence and tokenizing the data structure may include determining logical units in the text sequence. For example, the tokens may include logical units of text (e.g., names, dates, etc.) extracted from a log of deposits to a financial account. The log of deposits may include descriptions of transactions with the financial account. A description of the descriptions may include the following text: Direct Deposit Jane Peterson 031522. The tokens extracted from this text may include logical units of text such as "Direct Deposit," "Jane Peterson," and "031522." Tokenization may be performed via NLP of the unstructured data using any type of machine learning algorithm (and/or other methods) to identify the logical units of text.

In an embodiment, tokenization of the data structure may be performed by another entity (e.g., another information manager, the internal data sources 110, etc.) throughout a distributed system. In this example, the entity may obtain tokens and transmit the list of tokens to the information manager 100.

As shown by operation 319, information manager 100 includes means, such as a processor, memory, data management circuitry, or the like, for determining a similarity metric for each token of the tokens. The similarity metric may be a measure of how similar each token is to an identifier, the identifier being text associated with the relevant data. Determining the similarity metric may include calculating a Levenshtein's distance between the token and the identifier. Similarity metrics may include other calculations and may be determined via other methods without departing from embodiments disclosed herein.

In an embodiment, similarity metrics may be determined by another entity (e.g., another information manager) throughout a distributed system. In this example, the entity may determine the similarity metrics and transmit them to the information manager 100.

Continuing with the above example, the log of deposits to the financial account may include tokens identifying logical units of text (e.g., names, dates, etc.) extracted from the descriptions of transactions with the financial account. In this example, the identifier may be a name of a person. The log of deposits may be sourced from a joint financial account including descriptions of transactions with a financial account. The descriptions of transactions may include indicators of financial income for the person and a second person. In order to select only the transactions associated with the person, a similarity metric may be calculated between each token and the identifier. In order to determine which transactions are associated with the person, a Levenshtein's distance may be calculated between the person's name and each token in the log of deposits. In order to determine which tokens match the person's name, the tokens may be classified using a threshold as described below.

As shown by operation 320, information manager 100 includes means, such as a processor, memory, data management circuitry, or the like, for classifying each token of the tokens based on the similarity metric. Classifying the tokens may involve establishing a threshold for the similarity metric, the threshold determining whether a token may be classified as "similar" or "dissimilar" to the identifier. A token may be classified as "similar" to the identifier if the value of the similarity metric falls below the threshold. In contrast, a token may be classified as "dissimilar" to the identifier if the value of the similarity metric falls above the threshold.

In an embodiment, each token of the tokens may be classified by another entity (e.g., another information manager) throughout a distributed system. In this example, the entity may classify the tokens and transmit the classifications to the information manager 100.

Continuing with the above example, the similarity metric may be a Levenshtein's distance between each token and an identifier. The identifier may be a person's name and the tokens may be extracted from a log of deposits in order to identify transactions associated with the person. The threshold may be 0.5, with any Levenshtein's distance of 0.5 and below being classified as "similar" to the identifier and any Levenshtein's distance above 0.5 being classified as "dissimilar" to the identifier. Following classification of the tokens, the transactions associated with the person may be extracted from the data structure as described below.

As shown by operation 321, information manager 100 includes means, such as a processor, memory, data management circuitry, or the like, for obtaining relevant data based on the classified tokens. Relevant data may be obtained by collecting tokens classified as "similar" to an identifier, the identifier being text associated with the relevant data. Each token classified as "similar" may be associated with a particular entry in a data structure. Each of these entries may be collected in order to extract the relevant data from the data structure.

In an embodiment, relevant data may be obtained by another entity (e.g., another information manager) throughout a distributed system. In this example, the entity may obtain the relevant data and transmit the relevant data to the information manager 100.

Continuing with the above example, the tokens classified as "similar" may be tokens including text corresponding to the person's name (the identifier). These tokens may be associated with entries in a log of deposits including financial income data. In order to obtain all relevant data related to the financial income of the person, the income amounts associated with the tokens classified as "similar" may be added to obtain a total income for the person. By doing so, the income of the person may be isolated from an intermixed financial account (e.g., a joint account) that may include income data associated with the person and a second person. Consequently, accurate income data may be obtained from an unstructured data set that includes both relevant and extraneous income data. Decisions may be made and services may be provided based on the relevant data as described with reference to FIGS. 3A-3C. Refer to FIG. 3C for additional details regarding performing services based on the relevant data.

The method may proceed to operation 305.

FIGS. 3A-3D illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be embodied by software instructions. In this regard, the software instructions which embody the procedures described above may be stored by a memory of an apparatus employing an embodiment of the present invention and executed by a processor of that apparatus. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a computer-readable memory that may direct a computing device or other programmable apparatus to function in a particular manner, such that the software instructions stored in the computer-readable memory produce an article of manufacture, the execution of which implements the functions specified in the flowchart blocks. The software instructions may also be loaded onto a computing device or other programmable apparatus to cause a series of operations to be performed on the computing device or other programmable apparatus to produce a computer-implemented process such that the software instructions executed on the computing device or other programmable apparatus provide operations for implementing the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

Example System Operations

Figure 4A:
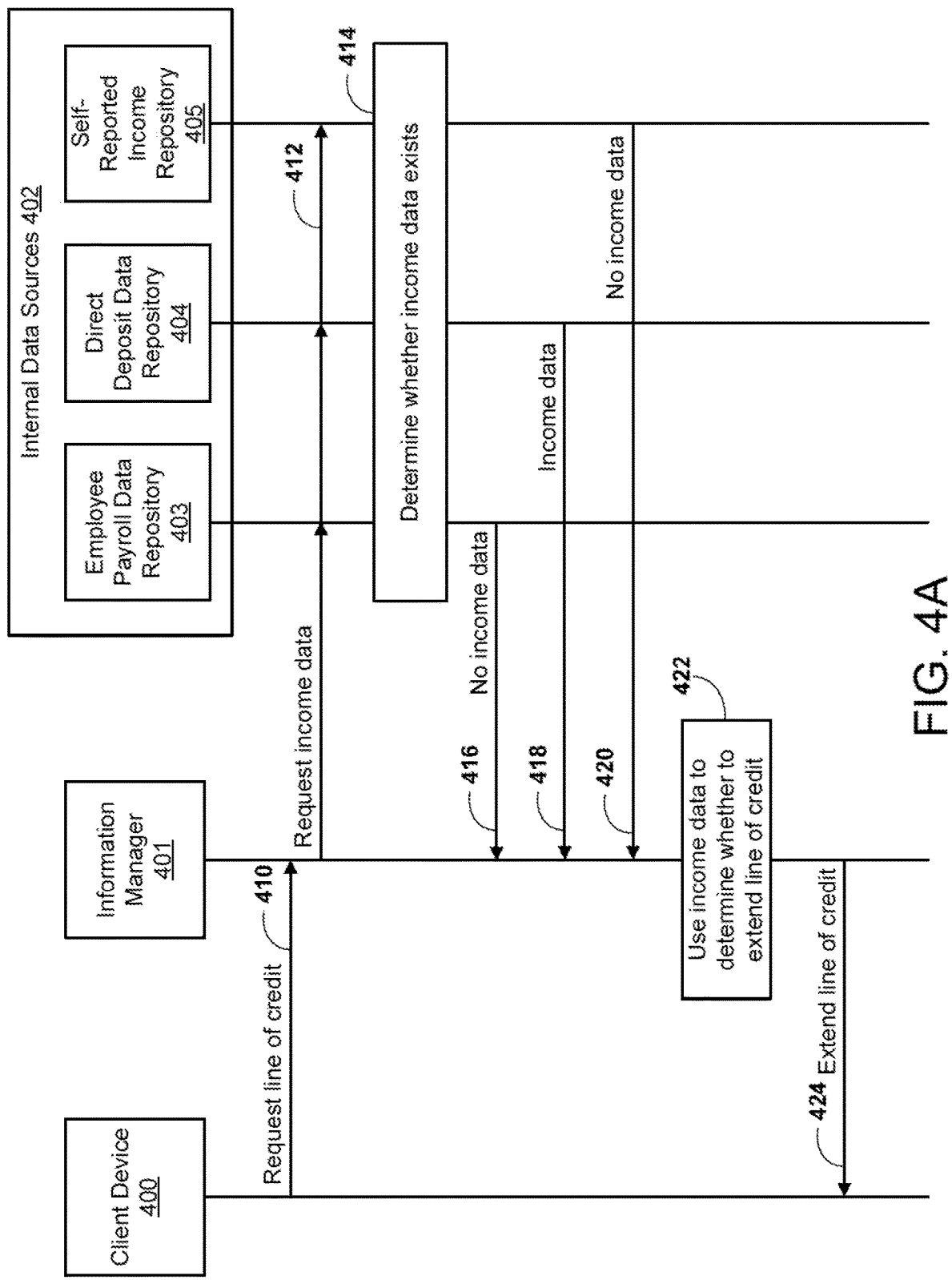

As noted above, information manager 100 may obtain data associated with a user of a client device (e.g., client device 140A) from internal data sources 110, third-party data sources 120, and/or other data sources in order to provide computer-implemented services to the user of the client device 140A. FIG. 4A shows a diagram illustrating example operations performed by components of a distributed system that may be performed when obtaining data and/or determining a preferred data source in order to obtain the data. In this figure, operations performed by a client device are shown along the line extending from the box labeled "client device 400." Similarly, operations performed by an information manager are shown along the line extending from the box labeled "information manager 401." Internal data sources 402 may include multiple data sources including employee payroll data repository 403, direct deposit data repository 404, and self-reported income repository 405. Operations performed by an employee payroll repository are shown along the line extending from the box labeled "employee payroll data repository 403," operations performed by a direct deposit data repository are shown along the line extending from the box labeled "direct deposit data repository 404," and operations performed by a self-reported income repository are shown along the line extending from the box labeled "self-reported income repository 405." Operations impacting two or more devices, such as data transmissions between devices, are shown using arrows extending between these lines. Generally, the operations are ordered temporally with respect to one another. However, it will be appreciated that the operations may be performed in other orders from those illustrated herein.

Turning to FIG. 4A, at operation 410, client device 400 requests a line of credit from information manager 401. Receiving a request for a line of credit from client device 400 may include an authentication step in order to verify the identity of the user of client device 400. For example, information manager 401 may receive a request for a new line of credit from client device 400. In order to verify the identity of the user of client device 400, information manager 401 may perform a single-factor or multi-factor authentication process with client device 400. Client device 400 may submit a password, pin, biometric scan, etc. in order to prove the validity of the request.

Following the receipt of the request for a line of credit and a successful authentication process, information manager 401 requests income data at operation 412. The request for income data may be transmitted to each of the data sources included in internal data sources 402. Internal data sources 402 may include employee payroll data repository 403, direct deposit data repository 404, and self-reported income repository 405.

At operation 414, the employee payroll data repository 403, direct deposit data repository 404 and self-reported income repository 405 may determine whether the income data exists. The employee payroll data repository 403, direct deposit data repository 404 and self-reported income repository 405 may store income data for a variety of users and may each determine whether the requested income data exists in their storage.

At operations 416-420, the employee payroll data repository 403, direct deposit data repository 404 and self-reported income repository 405 may report back to the information manager 401 regarding the requested income data. At operation 416, the employee payroll data repository 403 does not possess the income data and may transmit a message to that effect to the information manager 401. At operation 418, the direct deposit data repository 404 does possess the income data and may transmit the income data to the information manager 401. At operation 420, the self-reported income repository does not possess the income data and may transmit a message to that effect to the information manager 401.

In this example, the information manager 401 may select the income data obtained from the direct deposit data repository 404 as the preferred source of data. However, in another embodiment, the information manager 401 may assign a data quality score to the direct deposit data repository prior to obtaining the data. The data quality score may take into account the quantity of computing resources and security risk associated with obtaining the data from the direct deposit data repository. By doing so, the information manager 401 may compare the data quality score associated with the direct deposit data repository to a data quality score associated with a third-party source and make a determination regarding where to obtain the income data. In some embodiments, the data quality score may determine the third-party source the preferred data source.

At operation 422, the information manager 401 uses the income data to determine whether to extend the line of credit to the user of the client device 400. The information manager 401 may feed the income data (and/or other data associated with the user of client device 400) into an inference model trained to make determinations regarding the financial viability of the user. In this example, the information manager 401 may determine that the line of credit should be extended to the user. As a result, at operation 424, the information manager 401 extends the line of credit to the client device 400.

As noted above with reference to FIG. 1, information manager 100 may obtain data associated with a user of a client device (e.g., client device 140A) from internal data sources 110, third-party data sources 120, and/or other data sources in order to provide computer-implemented services to the user of the client device 140A. In some embodiments, information manager 100 may obtain unstructured data including relevant data intermixed with extraneous data. In order to provide computer-implemented services utilizing the unstructured data, relevant data must be extracted as described below.

Turning to FIG. 4B, a diagram is shown illustrating example operations performed by components of a distributed system that may be performed when extracting relevant data from an unstructured data set. In this example, it may be assumed that the information manager 100 has determined the direct deposit data repository 404 as the preferred data source for obtaining the income data required in order to determine whether to extend a line of credit to a user of client device 400.

At operation 430, the direct deposit data repository 404 transmits income data to the information manager 401. The income data may be sourced from a financial account associated with the user of client device 400. However, the financial account may be a joint account including transactions associated with more than one person. Information manager 401 may select only the transactions associated with the user as described below.

At operation 432, information manager 401 tokenizes the income data. In order to do so, information manager 401 may determine logical units of text in the income data and assign tokens based on the logical units of text. For example, a transaction may include information such as the date of the deposit, the name associated with the deposit, the source of the deposit, the amount of the deposit, etc. Tokens may be assigned based on the previously listed information and/or any other logical unit of text as identified using NLP.

At operation 434, information manager 401 determines a Levenshtein's distance between each token and the name of the user in order to identify transactions associated with the user. The Levenshtein's distance may be determined based on the minimum number of substitutions, deletions, and additions required in order to transform one token into the name of the user. The Levenshtein's distance may be calculated by assigning a value (e.g., 0.5) to every addition, substitution, and deletion completed as part of the transformation. For example, a token might be the name "John Peterson" and the user's name may be "Jane Peterson." The minimum number of substitutions, deletions, and additions required to change the name "John Peterson" to "Jane Peterson" may be 3. If each substitution, deletion, and addition is assigned a value of 0.5, the Levenshtein's distance between the token and the user's name may be 1.5.

At operation 436, information manager classifies the tokens. Classifying the tokens may include establishing a threshold for the Levenshtein's distances. Any token with a Levenshtein's distance below the threshold may be determined to match the user's name. Any Levenshtein's distance above the threshold may be determined to not match the user's name. Continuing with the previous example, a threshold of 1 may be established and the name "John Peterson" may be considered to not match the user's name "Jane Peterson." Each token may be classified as "similar" or "dissimilar" to the user's name and the "similar" tokens may be selected. The tokens classified as "similar" may contain indicators of financial income associated with the user. In order to determine the total income for the user, the indicators of financial income may be added together as described below.

At operation 438, information manager 401 obtains the user's income. In order to do so, information manager 401 may select the tokens classified as "similar" to the user's name, obtain the indicators of financial income associated with each of the tokens classified as "similar" to the user's name, and add up the income amounts for each transaction. By doing so, information manager 401 may obtain accurate income data associated with one person from an unstructured data set (e.g., a joint account including income data for two people).

At operation 440, information manager 401 uses the user's income to determine whether to extend the line of credit to the user. In order to do so, information manager 401 may feed the user's income into an inference model trained to make a decision regarding extending credit based on a user's income. The inference model may determine that the user should receive the line of credit based on the user's income.

At operation 442, information manager 401 extends the line of credit to the user of client device 400.

Example Unstructured Data Set

Figure 5C:
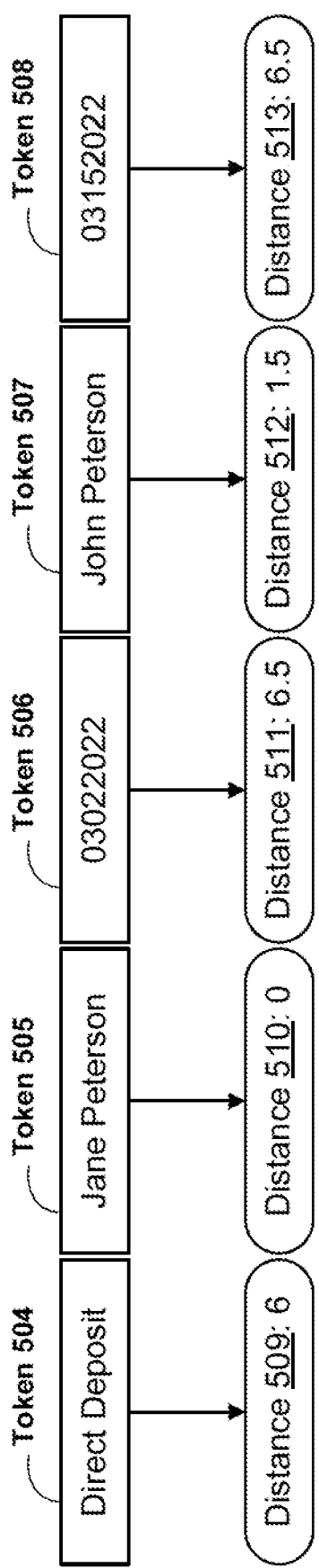

As previously discussed, information manager 100 may determine a preferred data source for obtaining data associated with a user of a client device (e.g., client device 140A). In some embodiments, the preferred data source may include both relevant and extraneous data in an unstructured data set. For example, a direct deposit data repository may include a log of deposits to a financial account associated with the user of the client device 140A. However, the financial account may be a joint account including descriptions of transactions for two or more people. Obtaining all income-related data from the financial account may give an inaccurate measurement of an individual's income. Information manager 100 may utilize NLP in order to select transactions associated with an individual from an unstructured data set. FIGS. 5A-5C illustrate an example log of deposits to a financial account that may be utilized by information manager 100 to determine the income of an individual.

Turning to FIG. 5A, a log of deposits is illustrated. This log of deposits may be sourced from a financial account. The financial account may be a joint account utilized by two individuals named Jane Peterson and John Peterson. Income data may exist in this financial account in the form of direct deposits associated with both Jane Peterson and John Peterson. Three transactions are shown as transaction 501, transaction 502, and transaction 503. Transaction 501 includes the following information: Direct Deposit Jane Peterson 03022022. Transaction 502 includes the following information: Direct Deposit John Peterson 03152022. Transaction 503 includes the following information: Direct Deposit Jane Peterson 030152022. In this example, the data of interest 500 may be Jane Peterson. Therefore, a bank may be attempting to determine Jane Peterson's income using the transactions included in this financial account. In order to do so, the transactions associated with Jane Peterson may be isolated from the transactions associated with John Peterson using NLP as described below.

Turning to FIG. 5B, the transaction descriptions may be tokenized using NLP to determine logical units of text. These logical units may be token 504, token 505, token 506, token 507, and token 508. Token 504 may include "Direct Deposit," token 505 may include "Jane Peterson," token 506 may include "03022022," token 507 may include "John Peterson," and token 508 may include "03152022." Each token may be compared to the data of interest 500 using similarity metrics as described below.

Turning to FIG. 5C, a similarity metric may be calculated between each token and the data of interest 500. The similarity metric may include a Levenshtein's distance between each of the tokens and name Jane Peterson. Distance 509 may be the Levenshtein's distance between token 504 and data of interest 500 and may have a value of 6. Distance 510 may be the Levenshtein's distance between token 505 and data of interest 500 and may have a value of 0. Distance 511 may be the Levenshtein's distance between token 506 and data of interest 500 and may have a value of 6.5. Distance 512 may be the Levenshtein's distance between token 507 and data of interest 500 and may have a value of 1.5. Distance 513 may be the Levenshtein's distance between token 508 and data of interest 500 and may have a value of 6.5.

In order to determine which tokens match the data of interest 500, a threshold may be established for the Levenshtein's distances. The threshold may be 1.0. Any token with a Levenshtein's distance below 1.0 may be classified as "similar" to data of interest 500 and any token with a Levenshtein's distance above 1.0 may be classified as "dissimilar" to data of interest 500. Therefore, token 504, token 506, token 507, and token 508 may be classified as "dissimilar" to data of interest 500. Token 505 may be classified as "similar" to data of interest 500.

In order to determine the income associated Jane Peterson (e.g., data of interest 500), the transactions including token 505 may be selected. The transactions including token 505 may be transaction 501 and transaction 503. Transaction 501 and transaction 503 may each include an income amount of $1,600. Therefore, the income associated with Jane Peterson may be $32,000. This income may be used to make decisions regarding financial services for the user.

Performing NLP in order to select the transactions associated with Jane Peterson provides a more accurate measurement of the user's income. For example, transaction 502 may include an income of $1,500. Therefore, adding all of the income data included in the financial account may yield a total income of $33,500, which would overstate Jane Peterson's income by $1,500 and may affect the financial services offered to the user as a result.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and the modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for decision making that relies upon unstructured data, wherein the unstructured data comprises relevant data intermixed with extraneous data, the method comprising:
    identifying, by a data management circuitry of an information manager, a data requirement event for the relevant data;
    obtaining, by communication hardware of the information manager, the unstructured data in response to the data requirement event, wherein obtaining the unstructured data comprises:
        identifying, by the data management circuitry of the information manager, one or more internal sources of data;
        retrieving, by the data management circuitry of the information manager, a data quality score for each of the one or more internal sources of data; and
        determining, by the data management circuitry of the information manager and based on the retrieved data quality scores, a preferred internal source of data from the one or more internal sources of data, wherein the unstructured data is obtained from the preferred internal source of data;
    tokenizing, by the data management circuitry, the unstructured data to produce tokens;
    determining, by the data management circuitry, a similarity metric for each token of the tokens, the similarity metric for each token being based on: an identifier associated with the relevant data, and the token;
    classifying, by the data management circuitry, each token of the tokens based on the similarity metric to produce classified tokens;
    extracting, by the data management circuitry, the relevant data based on the classified tokens; and
    performing, by a services circuitry of the information manager, an action set based on the relevant data.

2. The method of claim 1, wherein the identifier comprises a name of a person associated with the data requirement event.

3. The method of claim 2, wherein the relevant data comprises indicators of financial income of the person.

4. The method of claim 3, wherein the extraneous data comprises indicators of financial income for a second person.

5. The method of claim 4, wherein the unstructured data comprises a log of deposits to a financial account associated with the person.

6. The method of claim 5, wherein the unstructured data comprises descriptions of transactions with the financial account, and the descriptions comprising the indicators of the financial income of the person and the indicators of the financial income of the second person.

7. The method of claim 1, wherein tokenizing the unstructured data comprises:
    identifying, by the data management circuitry, a text sequence in the unstructured data;

determining, by the data management circuitry, logical units in the text sequence; and assigning, by the data management circuitry, tokens based on the logical units.

8. The method of claim 7, wherein determining the similarity metric for each token of the tokens comprises:

obtaining, by the data management circuitry, a token of the tokens;

obtaining, by the data management circuitry, the identifier associated with the relevant data; and determining, by the data management circuitry, the similarity metric between the token of the tokens and the identifier.

9. The method of claim 8, wherein the similarity metric is a Levenshtein's distance between the identifier associated with the relevant data and the token.

10. The method of claim 1, wherein classifying each token of the tokens based on the similarity metric comprises:

identifying, by the data management circuitry, a threshold for the similarity metric;

making a determination, by the data management circuitry, that a similarity metric falls below the threshold; and classifying, by the data management circuitry, the similarity metric as similar.

11. The method of claim 10, wherein classifying the similarity metric as similar comprises:

identifying, by the data management circuitry, a token of the tokens associated with the similarity metric;

making a second determination, by the data management circuitry, that the token associated with the similarity metric matches the relevant data; and classifying, by the data management circuitry, the token associated with the similarity metric as similar.

12. The method of claim 11, wherein obtaining the relevant data based on the classified tokens comprises:

identifying, by the data management circuitry, the tokens classified as similar;

identifying, by the data management circuitry, the relevant data associated with the tokens classified as similar; and obtaining, by the data management circuitry, a sum of the relevant data associated with the tokens classified as similar.

13. The method of claim 1, wherein classifying the tokens comprises:

identifying, by the data management circuitry, a threshold for the similarity metric;

making a determination, by the data management circuitry, that a similarity metric falls above the threshold; and classifying, by the data management circuitry, the similarity metric as dissimilar.

14. The method of claim 13, wherein classifying the similarity metric as dissimilar comprises:

identifying, by the data management circuitry, the token associated with the similarity metric;

making a determination, by the data management circuitry, that the token associated with the similarity metric does not match the relevant data; and classifying, by the data management circuitry, the token associated with the similarity metric as dissimilar.

15. The method of claim 1, wherein obtaining the unstructured data further comprises:

identifying, by the data management circuitry of the information manager, one or more internal sources of data;

computing, by the data management circuitry of the information manager, a data quality score for each of the one or more internal sources of data; and determining, by the data management circuitry of the information manager and based on the computed data quality scores, a preferred internal source of data from the one or more internal sources of data, wherein the unstructured data is obtained from the preferred internal source of data.

16. An information manager for decision making that relies upon unstructured data, wherein the unstructured data comprises relevant data intermixed with extraneous data, the information manager comprising:

a data management circuitry of the information manager configured to identify a data requirement event for the relevant data;

communication hardware of the information manager configured to obtain the unstructured data in response to the data requirement event, wherein obtaining the unstructured data further configures the data management circuitry of the information manager to:

identify one or more internal sources of data, retrieve a data quality score for each of the one or more internal sources of data, and determine, based on the retrieved data quality scores, a preferred internal source of data from the one or more internal sources of data, wherein the unstructured data is obtained from the preferred internal source of data; and wherein the data management circuitry is further configured to:

tokenize the unstructured data to produce tokens, determine a similarity metric for each token of the tokens, the similarity metric for each token being based on: an identifier associated with the relevant data, and the token, classify each token of the tokens based on the similarity metric to produce classified tokens, and extract the relevant data based on the classified tokens, wherein the information manager further comprises a services circuitry configured to perform an action set based on the relevant data.

17. The information manager of claim 16, wherein the relevant data comprises indicators of financial income of a person.

18. The information manager of claim 17, wherein the extraneous data comprises indicators of financial income for a second person.

19. The information manager of claim 18, wherein the unstructured data comprises a log of deposits to a financial account associated with the person.

20. The information manager of claim 19, wherein the unstructured data comprises descriptions of transactions with the financial account, and the descriptions comprising the indicators of the financial income of the person and the indicators of the financial income of the second person.

\* \* \* \* \*